US012698358B2

(12) United States Patent
Burdzy et al.

(10) Patent No.: US 12,698,358 B2
(45) **Date of Patent: \*Aug. 4, 2026**

(54) DEGRADABLE URETHANE AND URETHANE-UREA SYSTEMS

(71) Applicant: Urethane Systems USA LLC, Perth Amboy, NJ (US)

(72) Inventors: Matthew P. Burdzy, South Windsor, CT (US); Matthew Rasmuson, Waterbury, CT (US); Rebecca L. Nicholson, Suffern, NY (US)

(73) Assignee: Urethane Systems USA LLC, Perth Amboy, NJ (US)

( * ) Notice: Subject to any disclaimer, the term of this patent is extended or adjusted under 35 U.S.C. 154(b) by 942 days.

This patent is subject to a terminal disclaimer.

(21) Appl. No.: 17/428,294

(22) PCT Filed: Feb. 7, 2020

(86) PCT No.: PCT/US2020/017141
§ 371 (c)(1),
(2) Date: Aug. 4, 2021

(87) PCT Pub. No.: WO2020/163674
PCT Pub. Date: Aug. 13, 2020

(65) Prior Publication Data
US 2022/0119584 A1 Apr. 21, 2022

Related U.S. Application Data

(60) Provisional application No. 62/802,836, filed on Feb. 8, 2019.

(30) Foreign Application Priority Data

Mar. 6, 2019 (EP) ..................................... 19160956

(51) Int. Cl.
| | |
|---|---|
| *C08G 18/76* | (2006.01) |
| *C08G 18/10* | (2006.01) |
| *C08G 18/34* | (2006.01) |
| *C08G 18/38* | (2006.01) |
| *C08G 18/42* | (2006.01) |
| *C08G 18/66* | (2006.01) |
| *C08G 18/67* | (2006.01) |
| *C08J 11/26* | (2006.01) |
| *C09J 175/06* | (2006.01) |

(52) U.S. Cl.
CPC ......... *C08G 18/7621* (2013.01); *C08G 18/10* (2013.01); *C08G 18/341* (2013.01); *C08G 18/3814* (2013.01); *C08G 18/3868* (2013.01); *C08G 18/4238* (2013.01); *C08G 18/6651* (2013.01); *C08G 18/6765* (2013.01); *C08G 18/7671* (2013.01); *C08J 11/26* (2013.01); *C09J 175/06* (2013.01); *C08G 2230/00* (2013.01)

(58) Field of Classification Search
CPC .................................................. C08G 18/7621
See application file for complete search history.

(56) References Cited

U.S. PATENT DOCUMENTS

| | | | |
|---|---|---|---|
| 2,620,516 A | 12/1952 | Mueller et al. | |
| 3,314,923 A | 4/1967 | Muller | |
| 3,541,038 A | 11/1970 | Nakano | |
| 3,592,789 A | 7/1971 | Bolton | |
| 3,708,458 A | 1/1973 | Alberino | |
| 4,070,310 A | 1/1978 | Schneider | |
| 4,080,318 A * | 3/1978 | Smith ................ | C08G 18/4277 528/68 |
| 4,089,822 A | 5/1978 | Vial et al. | |
| 4,156,065 A | 5/1979 | Onder | |
| 4,182,825 A | 1/1980 | Jackle | |
| 4,268,426 A * | 5/1981 | Williams ........... | C08G 18/3221 528/80 |
| 4,404,258 A | 9/1983 | Loewrigkeit et al. | |
| 4,430,454 A * | 2/1984 | Castrantas ......... | C08G 18/6258 521/157 |
| 4,784,201 A | 11/1988 | Palinkas | |
| 4,832,098 A | 5/1989 | Palinkas | |
| 4,880,847 A * | 11/1989 | Credali .............. | C08G 18/6541 521/157 |
| 4,921,029 A | 5/1990 | Palinkas et al. | |
| 4,924,029 A | 5/1990 | Palinkas | |
| 4,929,667 A * | 5/1990 | Ban ....................... | C08G 18/73 524/718 |
| 4,934,425 A | 6/1990 | Gajewski et al. | |
| 4,964,425 A | 10/1990 | Chang | |
| 5,605,657 A | 2/1997 | Nybakken | |
| 6,800,667 B1 | 10/2004 | Kreyenschmidt et al. | |
| 2002/0114955 A1* | 8/2002 | Lamers .............. | C08G 18/8048 524/589 |
| 2003/0065124 A1 | 4/2003 | Rosenberg | |

(Continued)

FOREIGN PATENT DOCUMENTS

| | | |
|---|---|---|
| EP | 1491579 | 12/2004 |
| RU | 2275400 C1 | 4/2006 |

OTHER PUBLICATIONS

European Search Report from corresponding European Application No. 19150956.9, dated Jul. 22, 2019, two pages.

(Continued)

*Primary Examiner* — Irina Krylova
(74) *Attorney, Agent, or Firm* — Oblon, McClelland, Maier & Neustadt, L.L.P.

(57) ABSTRACT

Degradable polymers, including polyurethane and polyurethane-urea compositions, that can be used in aqueous, non-aqueous and dry hot environments as degradable polymers in oil, gas and other applications. Such polymers may be formed from polyurethane-forming compositions, including: (a) an isocyanate component; (b) one or more polyols; (c) a degrading-agent, and (d) optionally, one or more additives. A stoichiometric equivalent of the isocyanate (a) to the polyol (b) may be from about 80 to about 120%.

17 Claims, 17 Drawing Sheets

(56)          References Cited

U.S. PATENT DOCUMENTS

| 2005/0261447 A1* | 11/2005 | Koshiro | A63B 37/0075 |
| | | | 525/453 |
| 2016/0290091 A1 | 10/2016 | Takahashi | |
| 2017/0152371 A1 | 6/2017 | Duan | |
| 2019/0002667 A1 | 1/2019 | Kobayashi et al. | |
| 2022/0106429 A1* | 4/2022 | Cribb | C08G 18/168 |

OTHER PUBLICATIONS

European Search Report from corresponding European Application No. 19160186, dated Jul. 25, 2019, 2 pages.
Office Action mailed Feb. 7, 2024, in co-pending U.S. Appl. No. 17/426,666.

\* cited by examiner

DEGRADABLE URETHANE AND URETHANE-UREA SYSTEMS

CROSS-REFERENCE TO RELATED APPLICATIONS

The present application is the national stage of international application PCT/US2020/017141, filed on Feb. 7, 2020, and claims the benefit of the filing dates of U.S. Prov. Appl. No. 62/802,836, filed on Feb. 8, 2019, and European Appl. No. 19160956.9, filed on Mar. 6, 2019, the content of each of which is incorporated by reference.

The present invention relates generally to degradable polyurethane and polyurethane-urea compositions that can be used in aqueous, non-aqueous and dry hot environments as degradable polymers in oil, gas and other applications and to the processes for making the degradable polyurethane and polyurethane-urea compositions, and to mixtures for forming such compositions, including in one embodiment, degradable polyurethane and polyurethane-urea compositions made with use of mixtures of prepolymers and one or more anhydrides (or heterocyclic compounds).

BACKGROUND OF THE INVENTION

Broadly, degradable polymers are an important class of materials that provide a useful service life for a certain period of time then breakdown when exposed to certain fluids, temperatures and/or operating conditions. The degradation process reduces or eliminates the need for additional manufacturing or processing steps thereby saving time, cost, complexity, and potential downtime. There are many applications for degradable polymers in industrial, consumer, electronics, aerospace, mining, petrochemical, medical, and other manufacturing industries. The types of polymers that can be degraded include both glassy and rubbery networks.

Each class of polymers and operating environments represent specific challenges when designing a network that provides the desired utility, physical, mechanical, electrical, optical, thermodynamic, chemical, temperature, environmental resistance and/or other functional properties that then degrade at the desired rate into a form, physical state, and/or chemical species that facilitate a useful degradation profile and product. The strategies used to design the polymer and type(s) of degradation pathways along with the triggers, co-factors, and/or physical, chemical, mechanical, biological or other mechanisms that cause the polymer to breakdown is a complex problem, which is impacted by a number of factors including but not limited to time, temperature, diffusion, reaction kinetics, solubility, interaction energies, chemical exposure, radiation, oxygen content, concentration gradients, electrochemical potentials, aqueous and/or non-aqueous media, pH, and/or biological activity.

US2016/0290091 describes a degradable seal member for downhole tools formed from an ester, amide or urethane bond and a preferred aliphatic polyester. The degradable polymer, however, is limited to thermoplastic materials.

US2017/0152371 describes a degradable polyurethane containing polymer bound carboxylic acid groups. Several problems with polymer bound groups are the limited solid state mobility that slows down diffusion and reaction kinetics for degrading the polymer. Another problem with having acid groups in the uncured polymer is the reaction with isocyanate groups during the curing process, which generates bubbles that leads to numerous defects.

Reactions between anhydrides and isocyanates and/or curatives with an active hydrogen are well-known; see for example U.S. Pat. Nos. 3,314,923, 3,541,038, 3,592,789, 3,708,458, and 4,156,065. These reactions form imides, amides or amide-imides at temperatures low at 50° C. These reactions generate carbon dioxide and/or water as a by-product. Carbon dioxide and water lead to signification bubble formation in hot cast urethanes (like a high density foam) and a reduction in properties that limits the utility of the polymer.

U.S. Pat. No. 4,070,310 discloses for example a process for the production of polyurethane foams comprising mixtures of a polyisocyanate component, an isocyanate-reactive hydrogen-containing component and an organic compound which decomposes liberating carbon dioxide. Said organic compound can be different types of anhydride derivatives, which liberate carboxylic acid compounds upon decomposition.

According to EP1491579, carboxylic acid compounds can act as degrading agents of cured polyurethanes. EP1491579 discloses decomposing agents containing acid anhydride groups. However, EP1491579 does not disclose a non-cured polyurethane-forming composition, comprising an isocyanate component, an isocyanate-reactive component and a degrading-agent.

Problems with the state of the art include the use of rigid or brittle polymers that incorporate hydrolysable bonds; the use of reagents that create side-reactions causing bubbles, voids, and a loss in properties making it difficult to mold parts; the use of polymer bound reagents which limits solid state diffusion; the need for compression molding operations to produce void-free articles; and the use of an active degrading-agent when added in an amount that would be needed to degrade the polymer catalyzes the chain extension and/or cross-linking reaction leading to a decrease in pot life and a gel time that is too short to mold a useable article. It is not expected based on the state of the art that unreacted anhydrides or heterocyclic compounds can be added and cured within reactive urethane networks.

A need has, therefore, been recognized in connection with overcoming the shortcomings of the state of the art.

Surprisingly, it was discovered that anhydrides and/or heterocyclic compounds can be incorporated into urethane networks with minimal side-reactions by forming the polymer matrix faster than the rate of reaction of the anhydride with the isocyanate or curative to thereby prepare degradable polymers at temperatures that were not previously thought possible.

It was discovered that novel degradable polyurethane and/or polyurethane-urea containing compositions could be prepared with a shorter service life as compared to conventional compositions. The service life is understood broadly to be a product's total life in use. As can be appreciated any particular service life will vary greatly depending upon the use of a product. Such novel degradable polyurethane and/or polyurethane-urea containing compositions show increased degradation when exposed to degrading conditions such as aqueous, non-aqueous and/or thermal environments for example between 25° C. to about 350° C. thus providing greater utility, flexibility and ease of use.

It was further discovered that the service life, rate of degradation, and level of tackiness could be varied significantly by selecting novel combinations of different isocyanates, diols, polyols, prepolymers, curatives and anhydrides.

If not otherwise stated herein, it is to be assumed that all patents, patent applications, patent publications and other publications mentioned and cited herein are hereby fully incorporated by reference herein as if set forth in their entirety herein.

For a better understanding of the present invention, together with other and further features and advantages thereof, reference is made to the following description, taken in conjunction with the accompanying drawings. The scope of the invention will be pointed out in the appended claims.

BRIEF SUMMARY OF THE INVENTION

There is broadly contemplated, in accordance with at least one presently preferred embodiment of the present invention, a polyurethane-forming composition, comprising: an isocyanate component, an isocyanate-reactive component, a degrading-agent, and optionally, one or more additives. In an embodiment a stoichiometric equivalent of an isocyanate component to an isocyanate-reactive component is from about 80 to about 120% and in another embodiment from about 85% to about 110%.

In a further embodiment, the isocyanate-reactive component is a chain extender, a cross-linker, a polyol or combinations thereof. In another embodiment, polyurethane formed of the reaction of the composition has an increased degradability as compared with a polyurethane formed from the analogous composition above absent the c) degrading-agent. In another embodiment, the degrading-agent comprises at least one anhydride compound or a heteroyclic compound and may be present in an amount of about 0.25 to about 25 wt %, based on total of the isocyanate and isocyanate-reactive components. In another embodiment, the isocyanate component comprises a diisocyanate or a polyisocyanate. In another embodiment, the reactive component comprises one or more polyols.

In a further embodiment of the present invention, there is a polyurethane composition formed of the reaction of a polyurethane-forming composition, comprising: an isocyanate component, an isocyanate-reactive component, a degrading-agent, and optionally, one or more additives.

In a further embodiment of the present invention, there is a polyurethane composition, comprising: the reaction product of i) a modified prepolymer formed of a mixture of a prepolymer and a degrading-agent, ii) a chain extender, and iii) optionally one or more additives. In one embodiment, the prepolymer is formed of the reaction of an diisocyanate and a polyol.

In a further embodiment of the present invention, there is an article comprising formed from a polyurethane-forming composition, said composition comprising an isocyanate component, an isocyanate-reactive component, a degrading-agent, and optionally, one or more additives. In a further embodiment of the present invention, there is an article comprising a polyurethane composition, said composition comprising the reaction product of i) a modified prepolymer formed of a mixture of a prepolymer and a degrading-agent, ii) a chain extender, and iii) optionally one or more additives.

In a further embodiment of the present invention, there is a process for degrading a degradable polyurethane comprising providing an polyurethane article, subjecting the article to aqueous, non-aqueous and/or thermal environments between 25° C. to about 350° C. or combinations thereof, wherein said subjecting step results decrease to one or more of the article's (i) mechanical properties comprising one or more of hardness, tensile strength, elongation, and/or sealing pressure, (ii) soluble fraction, (ii) liquid fraction, or (ii) solid fraction wherein the solid fraction may fracture into small pieces.

In one embodiment of the present invention, the article formed from a polyurethane-forming composition is essentially free from bubbles.

In another embodiment there is a polyurethane-forming composition, comprising: an isocyanate component comprising toluene diisocyanate (TDI), an isocyanate-reactive component comprising a poly(ethylene adipate) glycol and a 4,4'-methylenebis(o-chloroaniline) (MOCA) chain extender, a degrading-agent comprising hexahydrophthalic anhydride (HHPA) and in one embodiment the TDI being reacted with the poly(ethylene adipate) glycol to form a prepolymer having low free monomer content of 0.01-10.0 wt % and in another embodiment from 0.05-5.0 wt % based on the prepolymer and in another embodiment the HHPA is present in an amount of about 3 to about 20 wt % based on the prepolymer.

In another embodiment there is a polyurethane-forming composition, comprising: an isocyanate component comprising methylene-bis-(phenyl isocyanate) (MDI), an isocyanate-reactive component comprising a poly(ethylene adipate) glycol and a hydroquinone-bis-hydroxyethyl ether (HQEE) chain extender, a degrading-agent comprising maleic anhydride and in one embodiment the MDI being reacted with the poly(ethylene adipate) glycol to form a prepolymer having low free monomer content of 0.01-10.0 wt % and in another embodiment from 0.05-5.0 wt % based on the prepolymer and in another embodiment the HQEE is present in an amount of about 3 to about 20 wt % based on the prepolymer.

For a better understanding of the present invention, together with other and further features and advantages thereof, reference is made to the following description, taken in conjunction with the accompanying drawings, and the scope of the invention will be pointed out in the appended claims. As used in this description and the appended claims, the singular forms "a," "an," and "the" include plural referents unless the content clearly dictates otherwise.

DETAILED DESCRIPTION OF THE PREFERRED EMBODIMENTS

Figure 1:
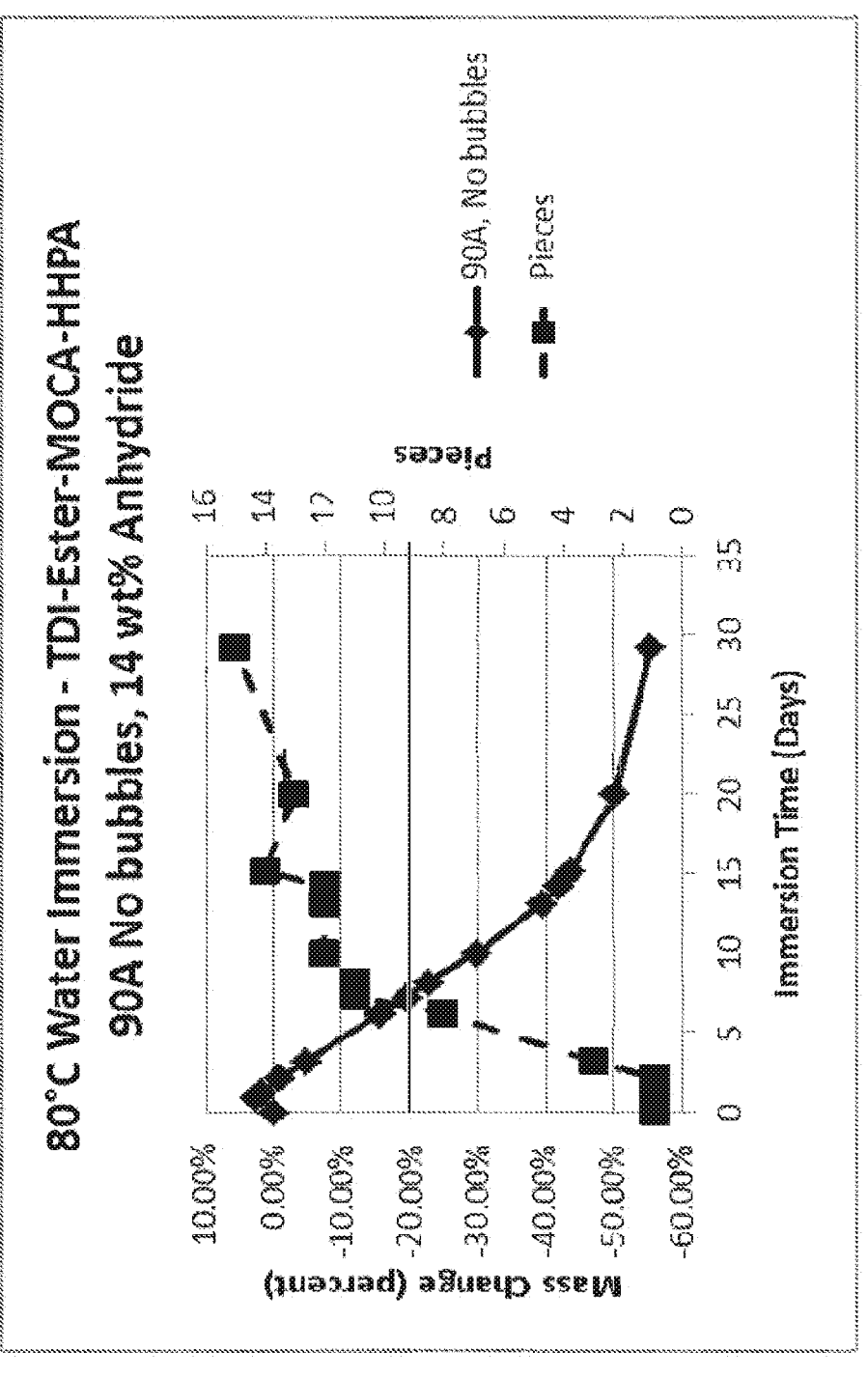
FIG. 1 is a graph showing the water immersion results of polyurethane of Example 1.
Figure 2:
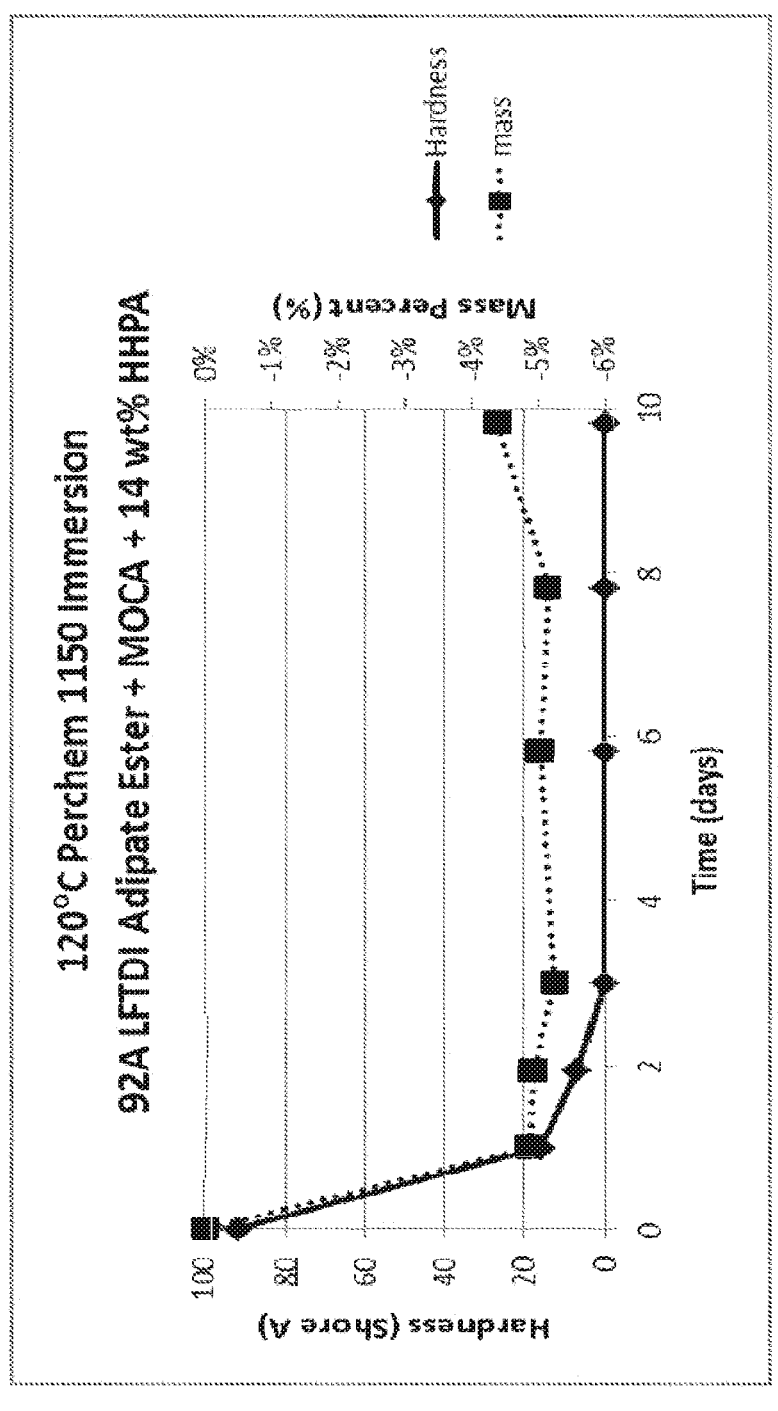
FIG. 2 is a graph showing the perchem immersion results of polyurethane of Example 1.
Figure 3:
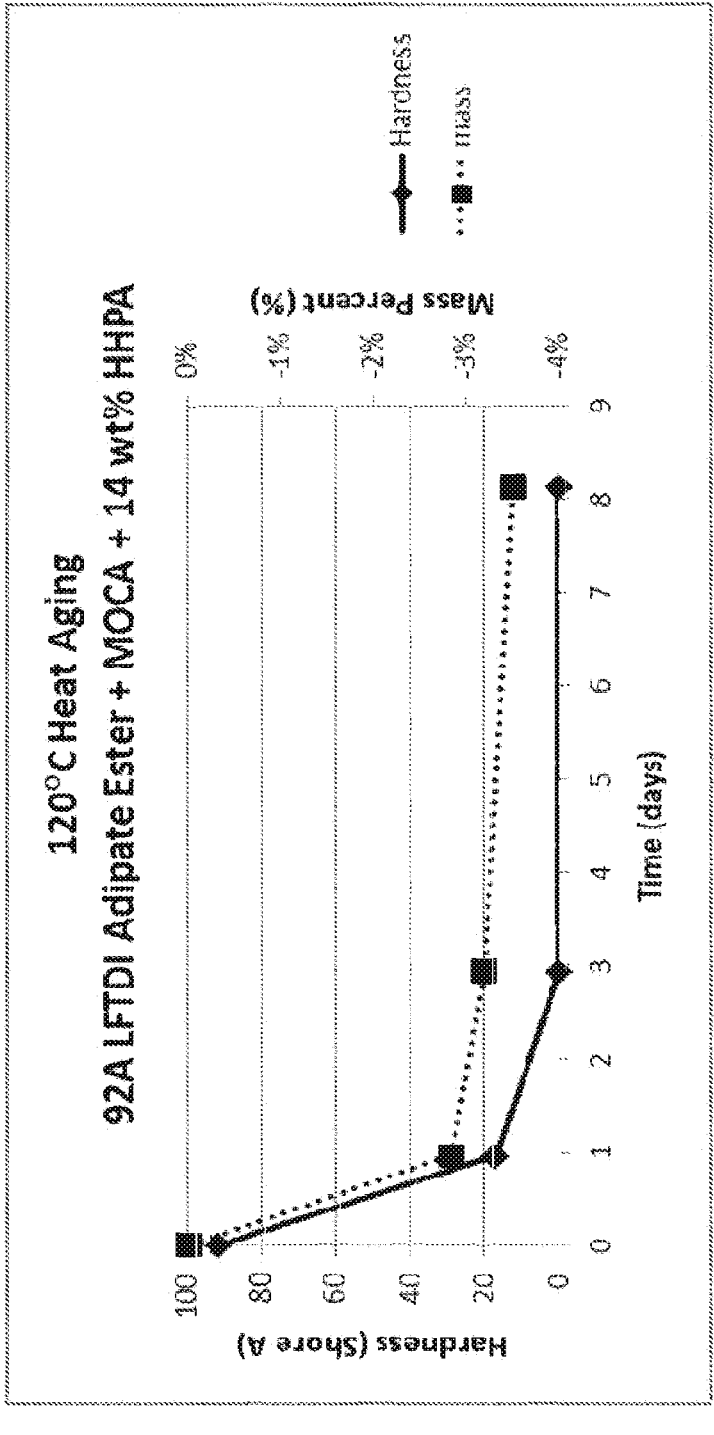
FIG. 3 is a graph showing the heat aging results of polyurethane of Example 1.
Figure 4:
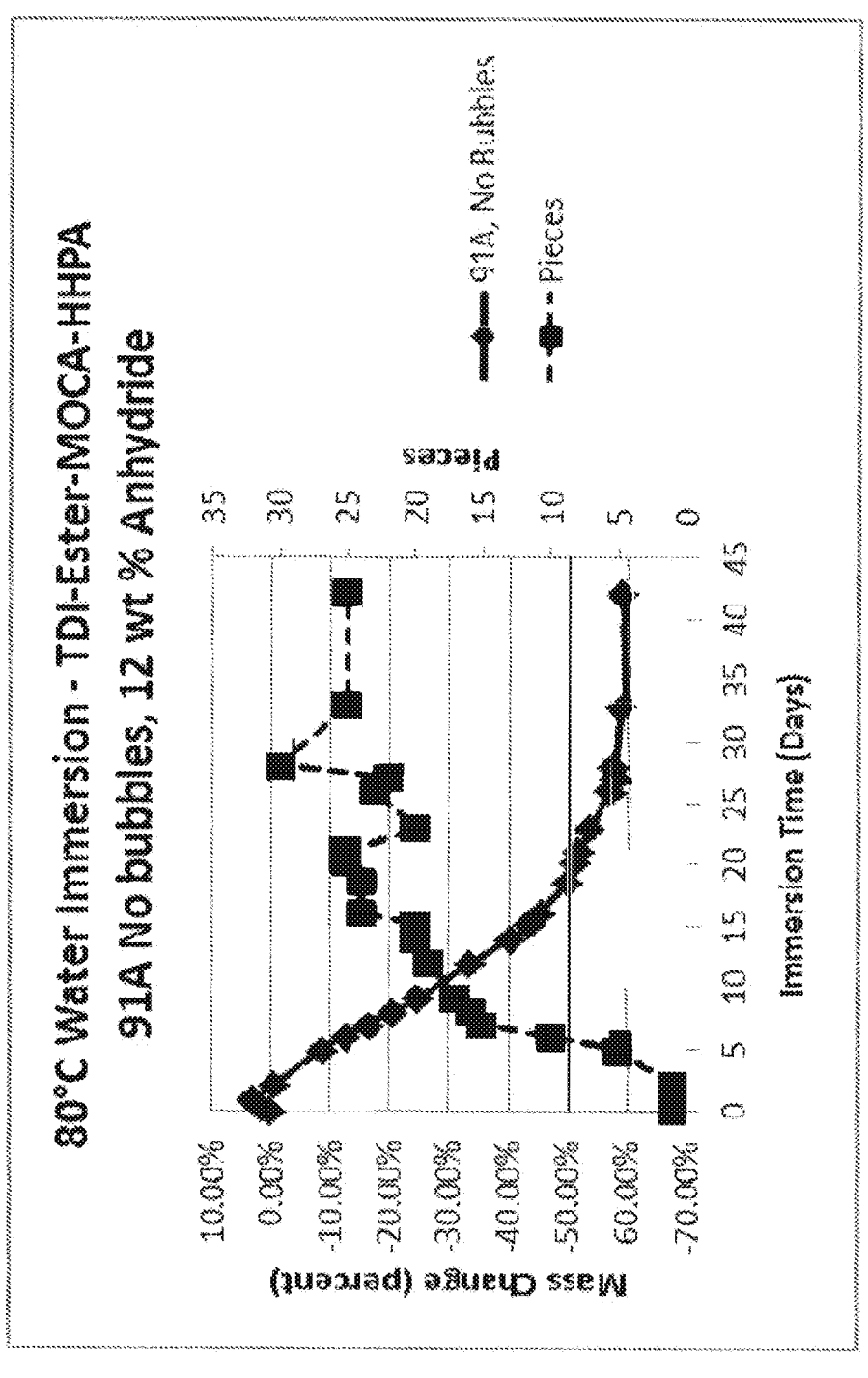
FIG. 4 is a graph showing the water immersion results of polyurethane of Example 2.
Figure 5:
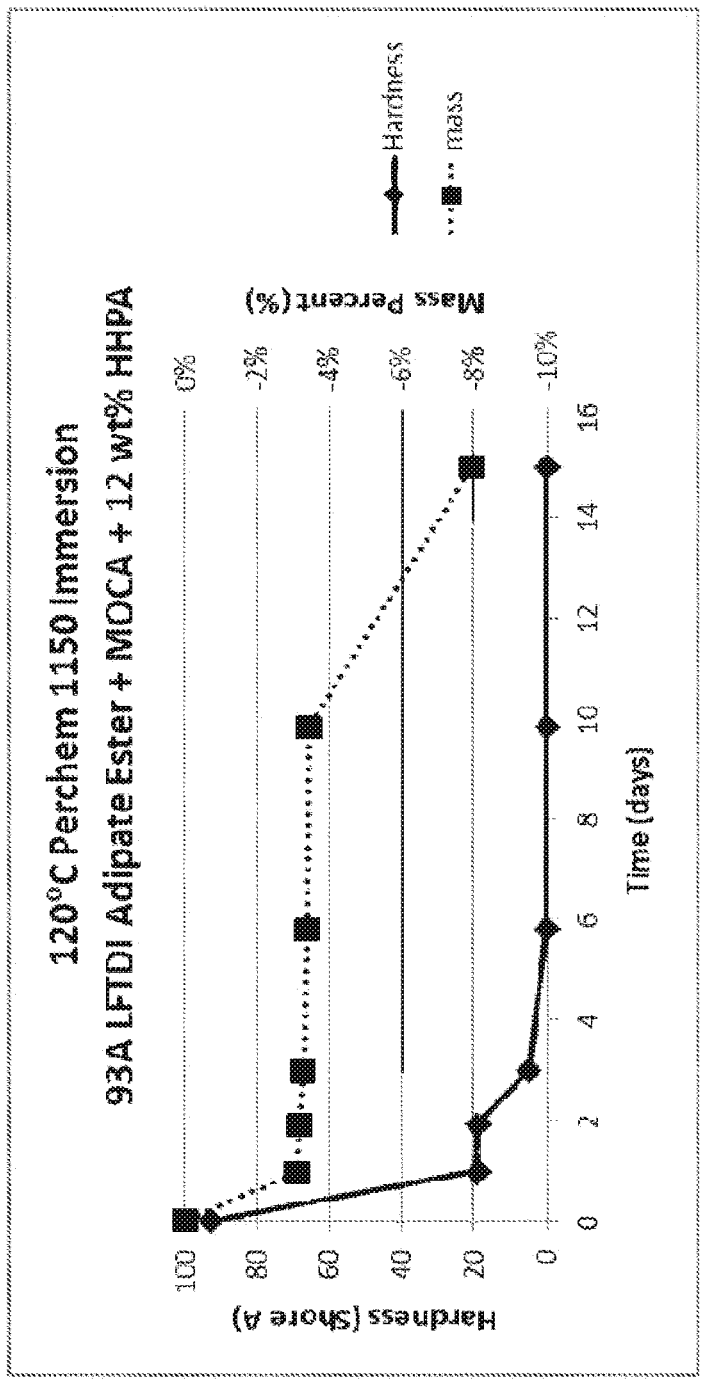
FIG. 5 is a graph showing the perchem immersion results of polyurethane of Example 2.
Figure 6:
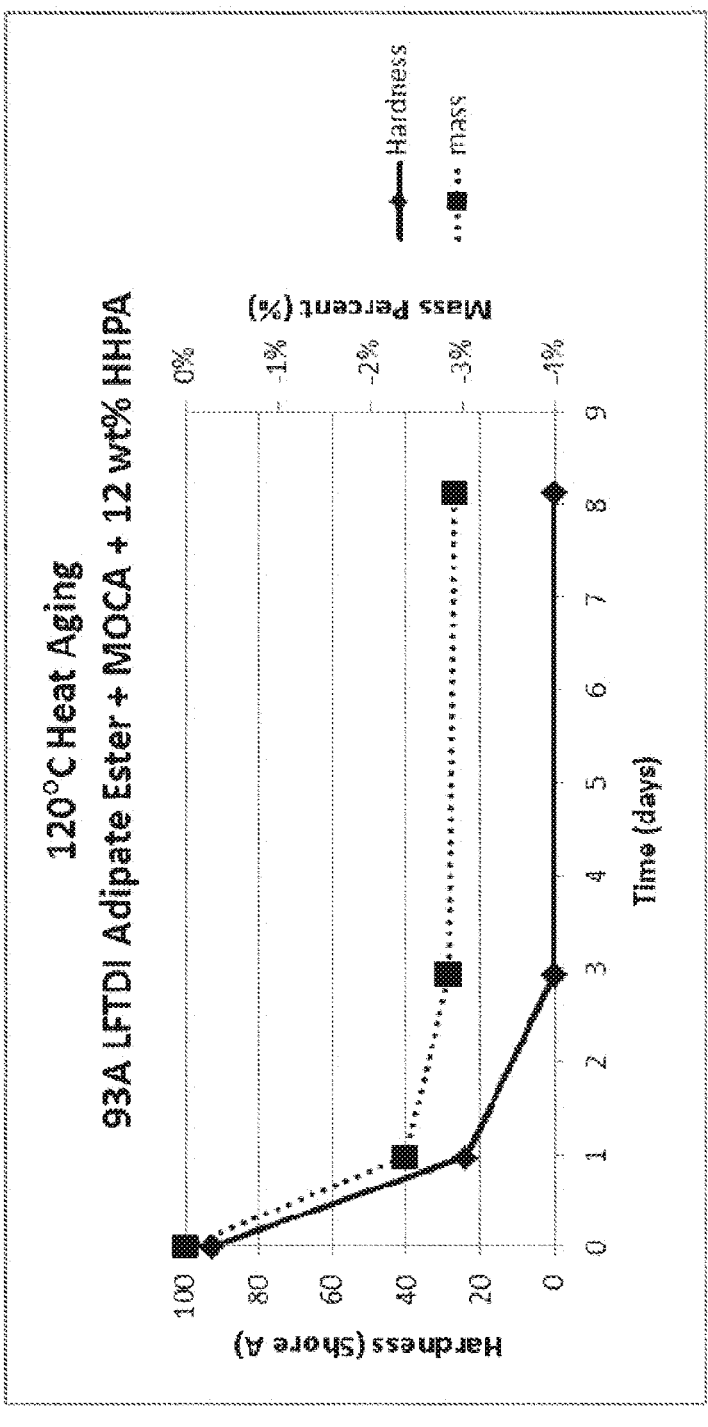
FIG. 6 is a graph showing the heat aging results of polyurethane of Example 2.
Figure 7:
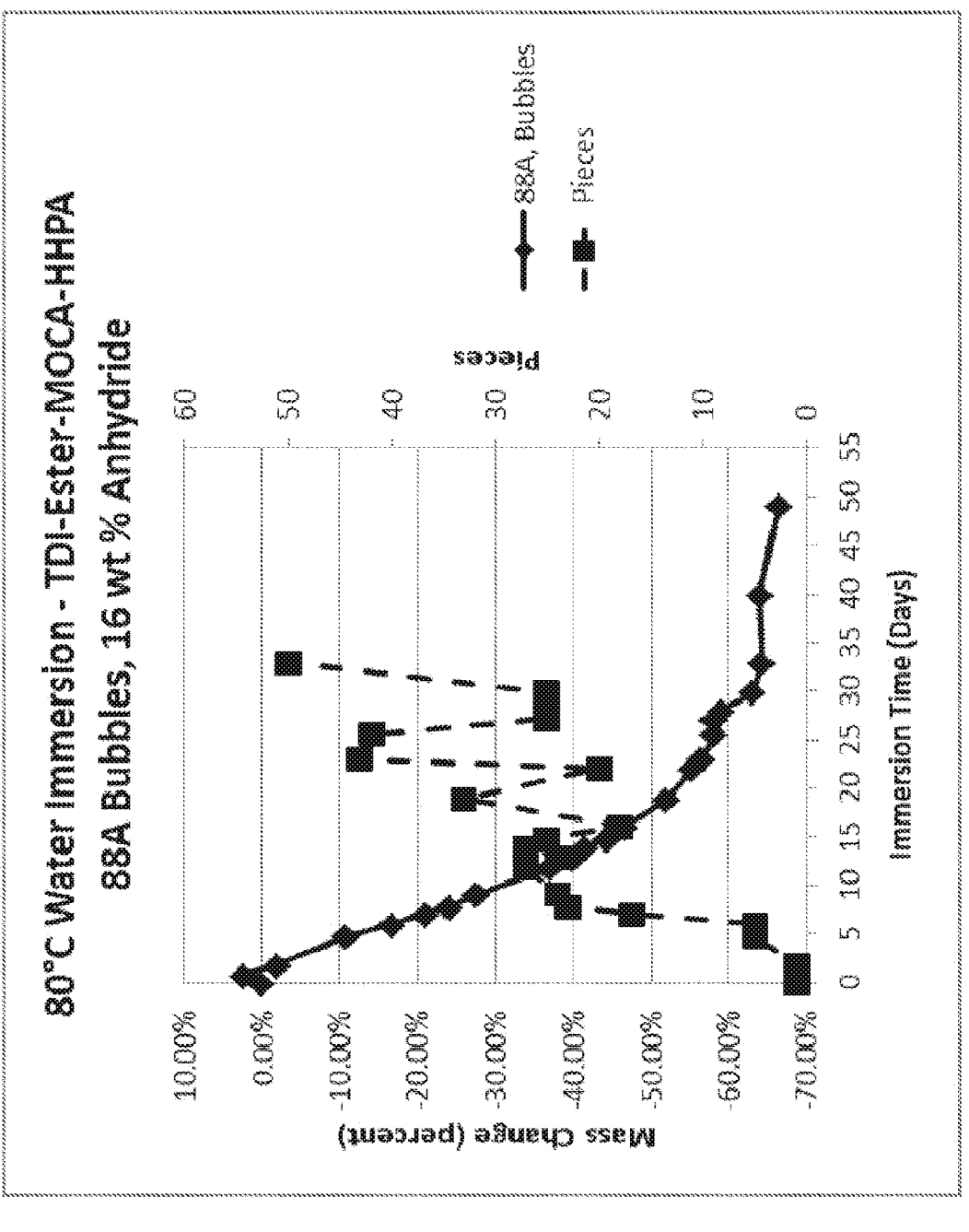
FIG. 7 is a graph showing the water immersion results of polyurethane of Example 3.
Figure 8:
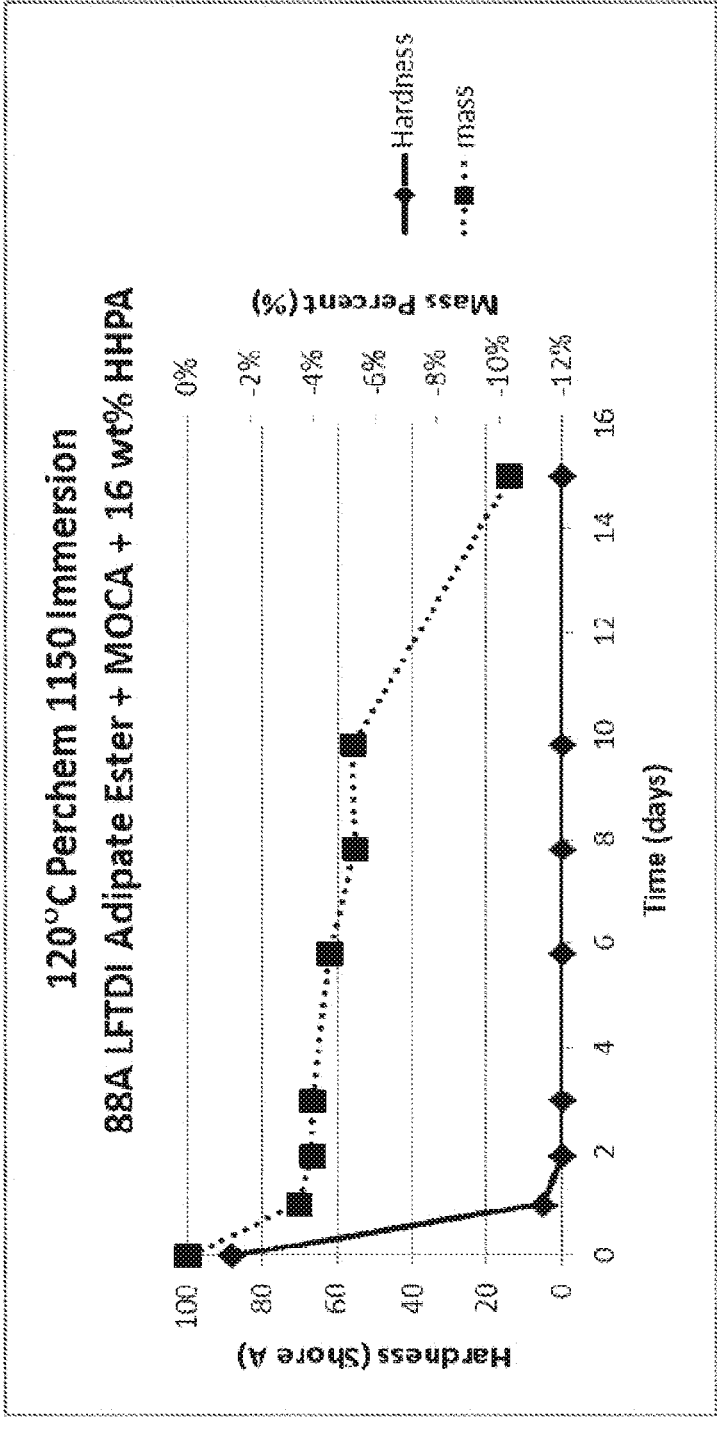
FIG. 8 is a graph showing the perchem immersion results of polyurethane of Example 3.
Figure 9:
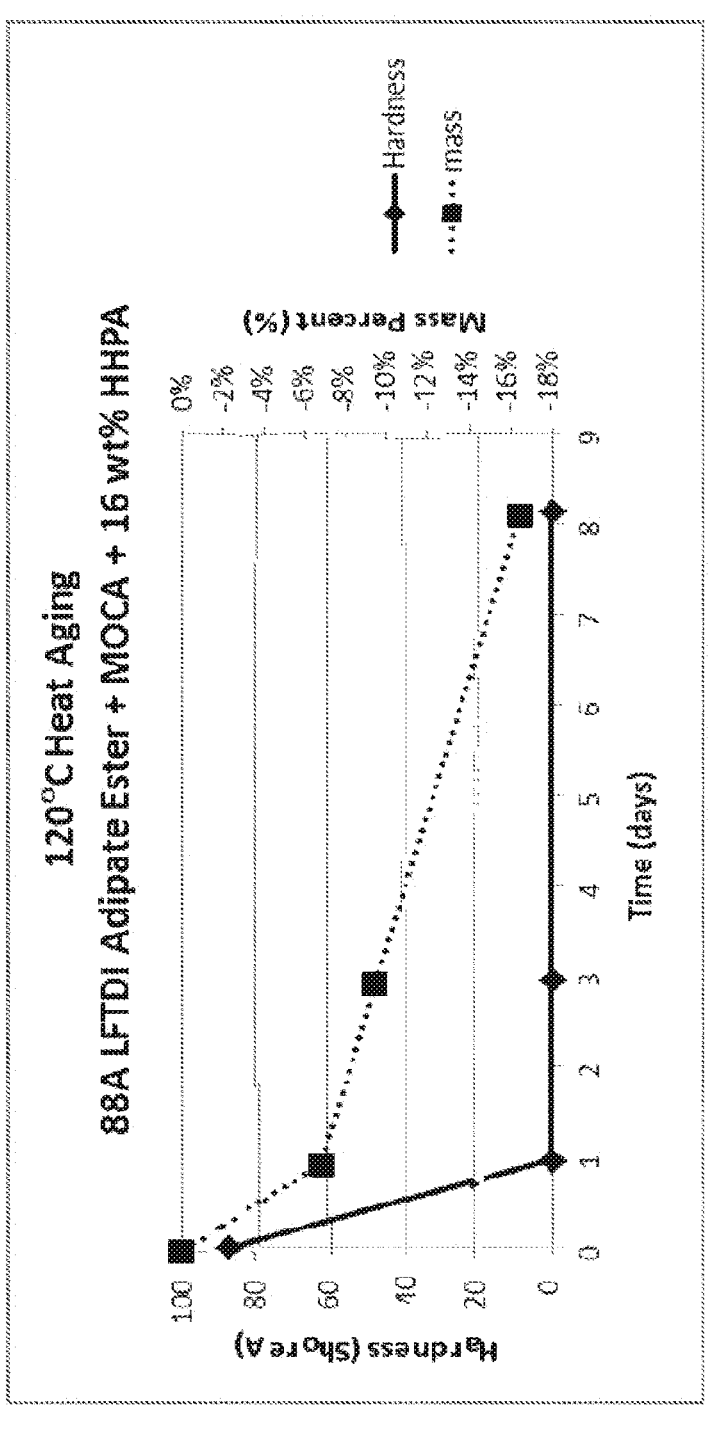
FIG. 9 is a graph showing the heat aging results of polyurethane of Example 3.
Figure 10:
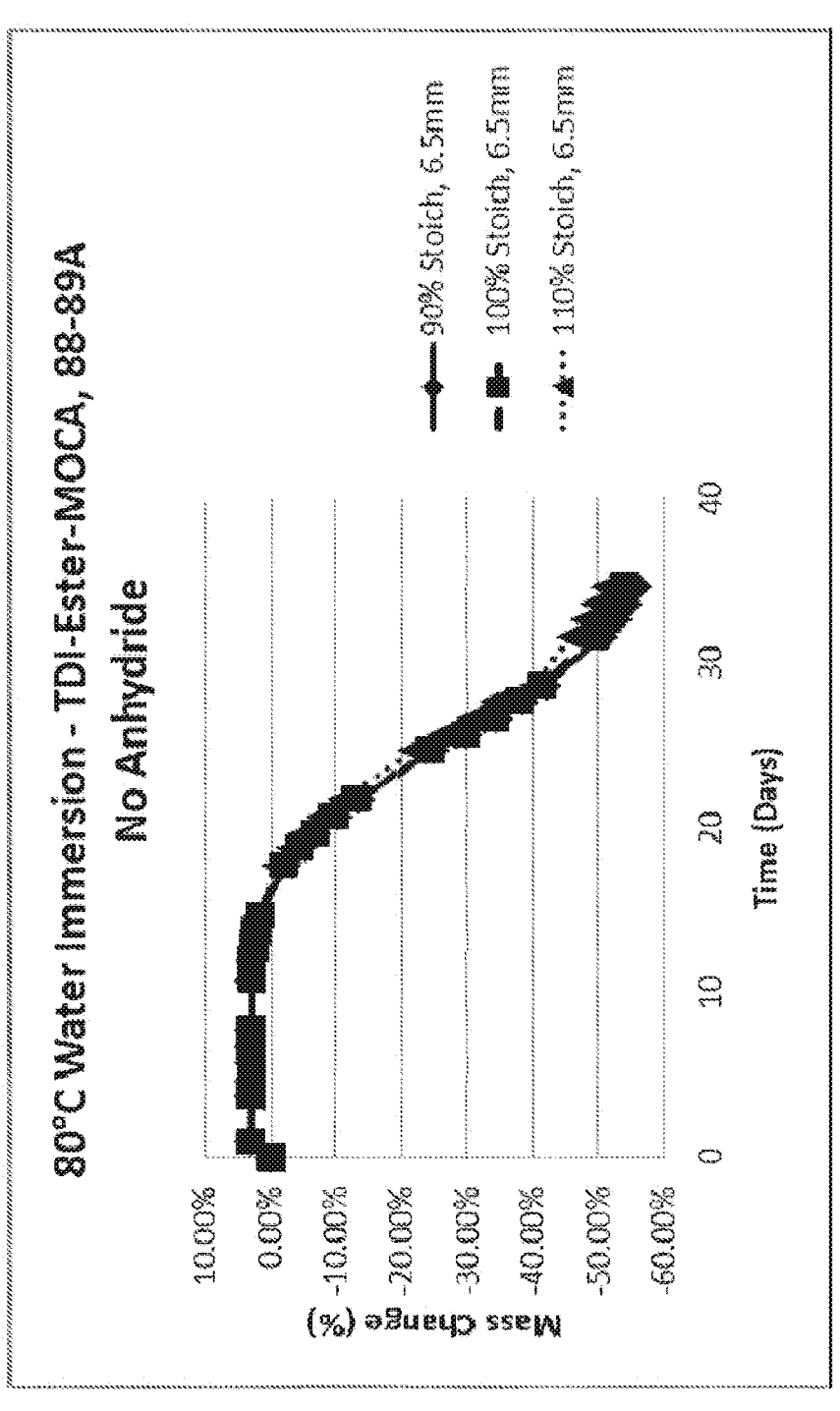
FIG. 10 is a graph showing the water immersion results of polyurethane of Example 4.
Figure 11:
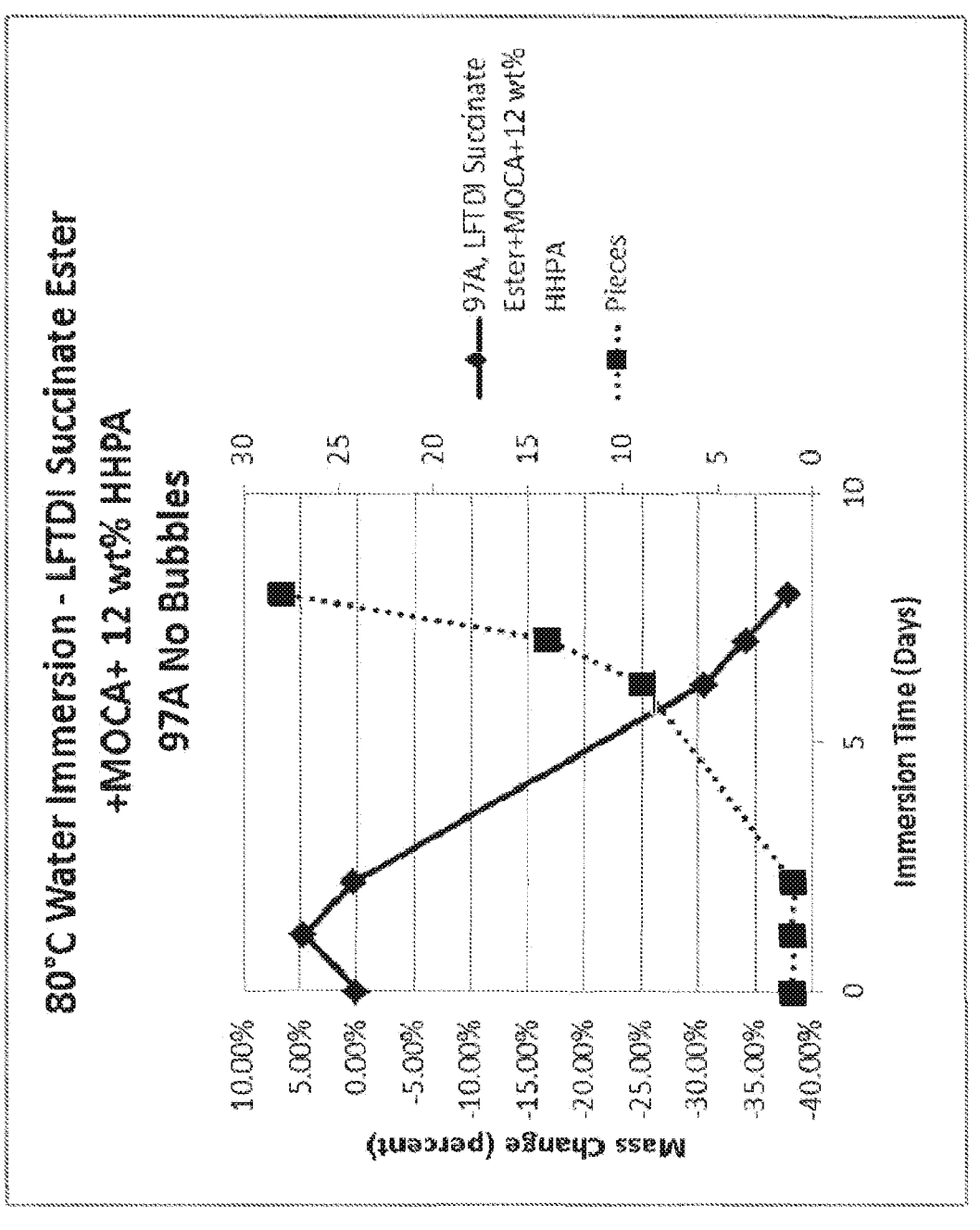
FIG. 11 is a graph showing the water immersion results of polyurethane of Example 10.
Figure 12:
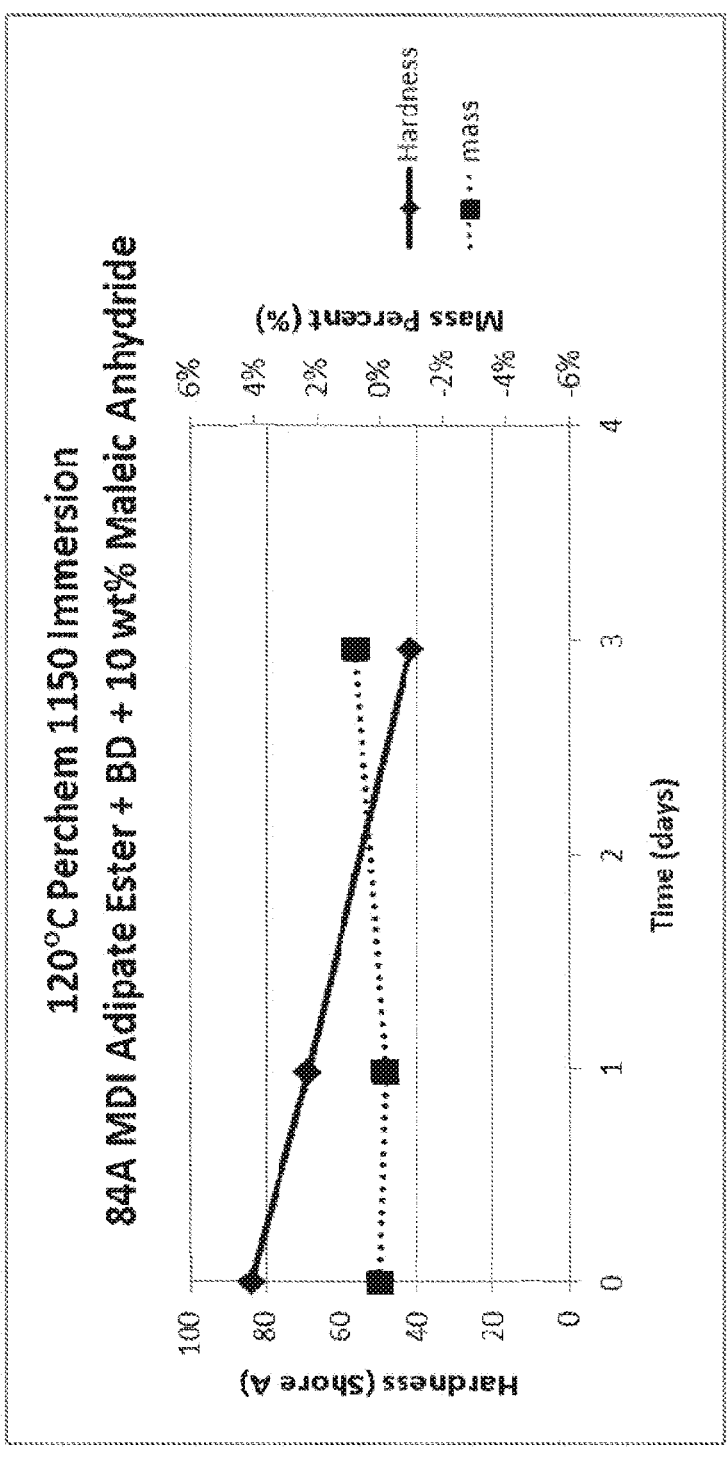
FIG. 12 is a graph showing the perchem immersion results of polyurethane of Example 12.
Figure 13:
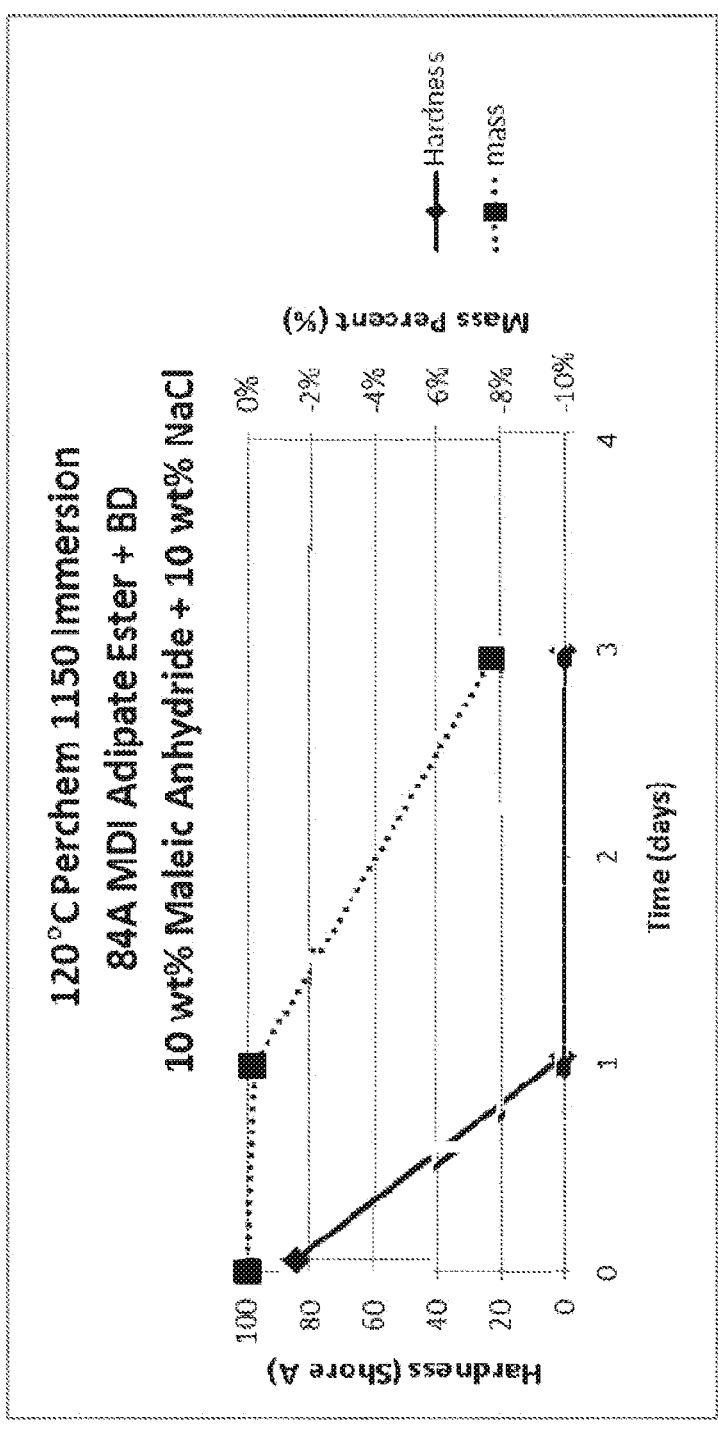
FIG. 13 is a graph showing the perchem immersion results of polyurethane of Example 12.
Figure 14:
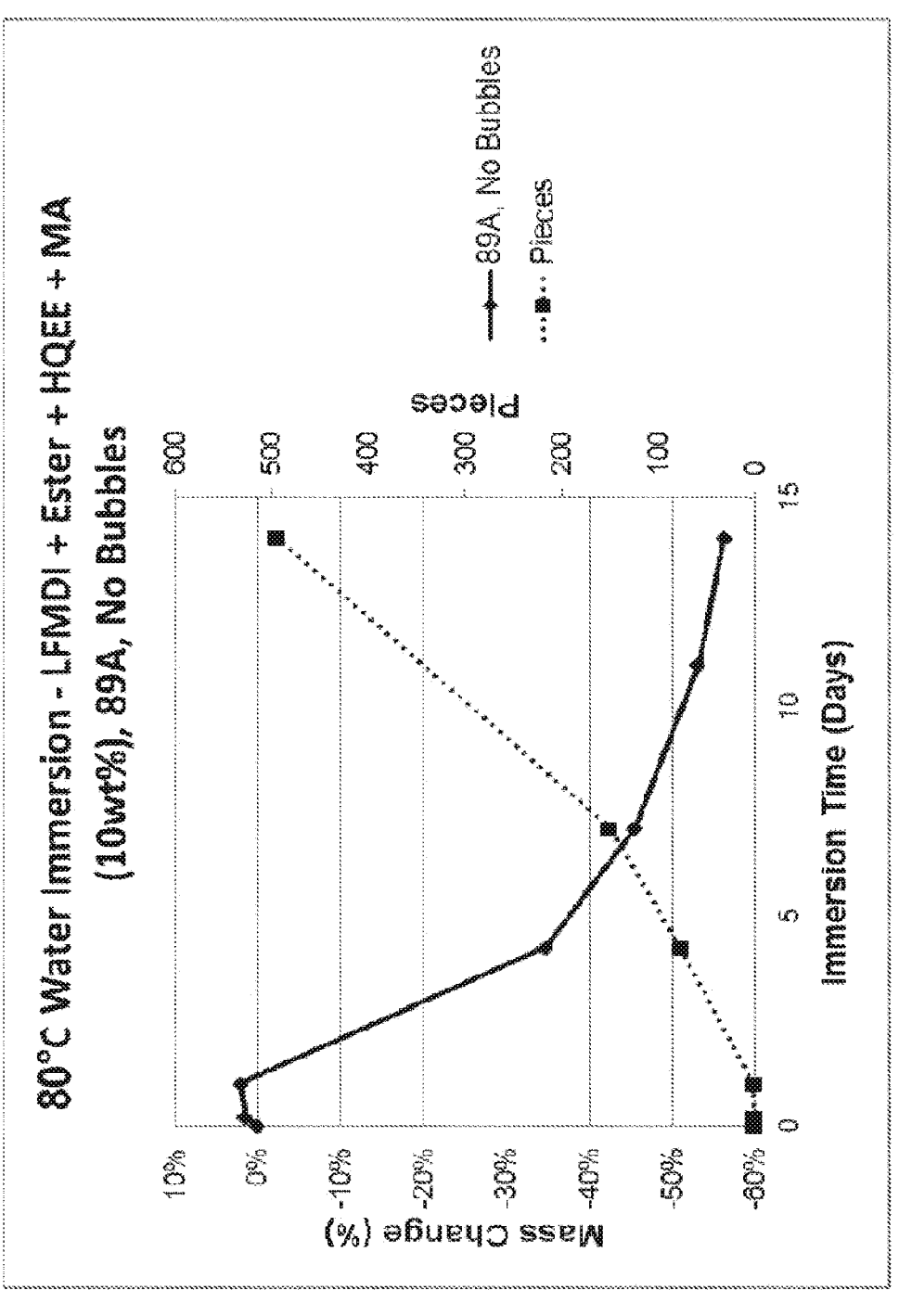
FIG. 14 is a graph showing the water immersion results of polyurethane of Example 14.
Figure 15:
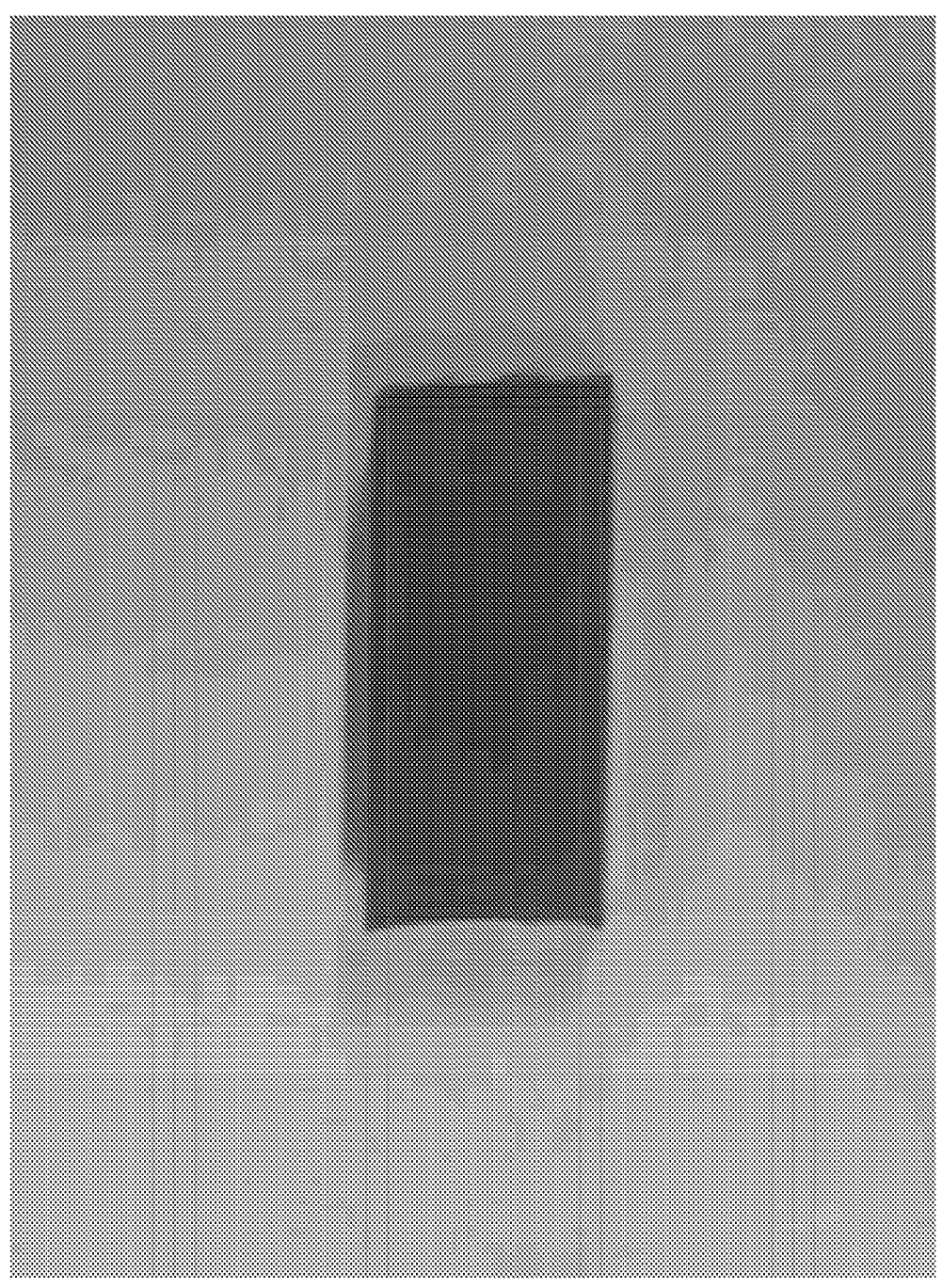
FIG. 15 is a photograph of the polyurethane of Example 14 without immersion (Cured 89 A, No Immersion).
Figure 16:
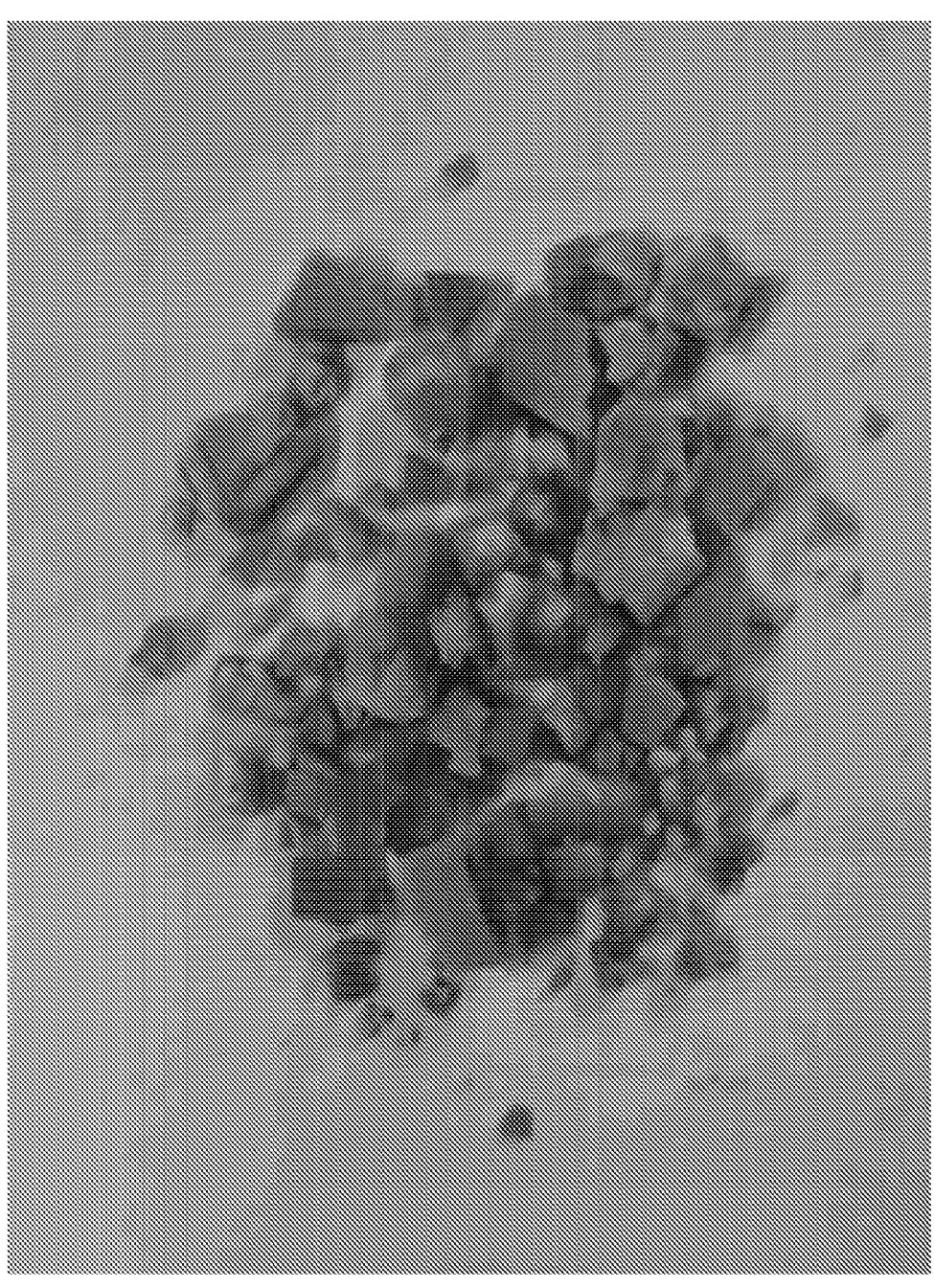
FIG. 16 is a photograph of the polyurethane of Example 14 with aqueous immersion (4 days 80° C. aqueous immersion).
Figure 17:
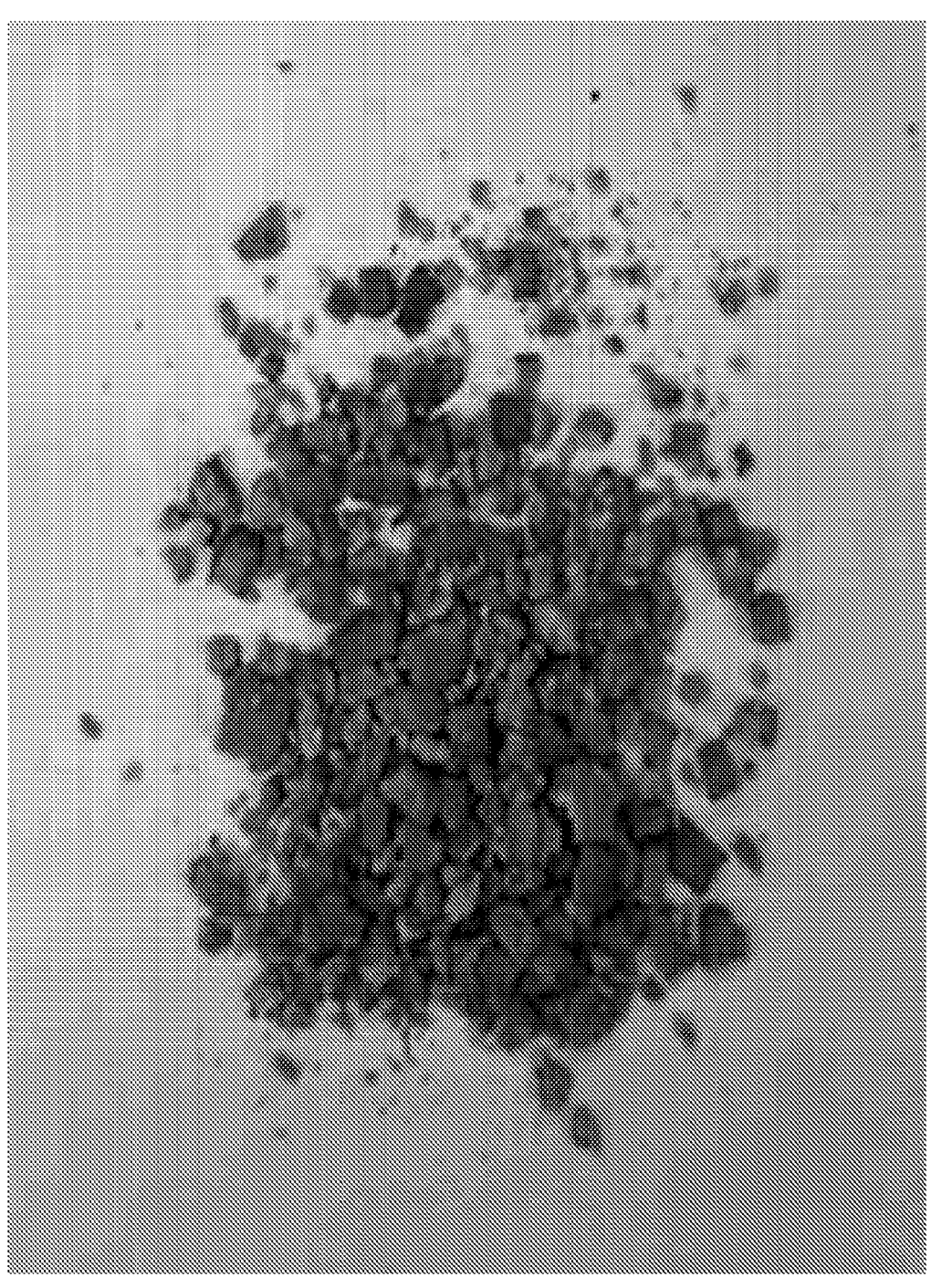
FIG. 17 is a photograph of the polyurethane of Example 14 with aqueous immersion (11 days 80° C. aqueous immersion).

Polyurethanes compositions of the invention are formed by chemical reaction of the components of a polyurethane-forming composition, namely the reaction between an isocyanate component, such as diisocyanate, an isocyanate-reactive component, such as a polyol, chain-extender, or cross-linking compound and combinations thereof, and a degrading-agent, such as anhydride or heterocyclic compound, thereby forming repeating urethane groups, generally, in presence of a catalyst, and/or other additives. Often, ester, ether, urea and aromatic rings are also present along with urethane linkages in the polyurethane backbone formed. Where (di)amines are used as chain extender to further extend the polyurethane chains formed of the reaction between isocyanate component and a isocyanate-reactive component, then a polyurethane-urea is formed. Unless clearly provided otherwise, as used throughout this application, polyurethane is to be understood to include polyurethane-urea and poly(urea) networks.

The polyurethane of the invention can be formed into numerous useful articles by various means known such as coating, casting, compression molding, injection molding, and milling processes. In one embodiment such articles include those used as tools or implements in subterranean applications. Illustratively, such articles include flappers, hold down dogs and springs, screen protectors, seal bore protectors, electric submersible pump space out subs, full bore guns, chemical encapsulations, slips, dogs, springs and collet restraints, liner setting sleeves, timing actuation devices, emergency grapple release, chemical encapsulation containers, screen protectors, beaded screen protectors, whipstock lugs, whipstock coatings, pins, set screws, emergency release tools, gas generators, mandrels, release mechanisms, staging collars, C-rings, components of perforating gun systems, disintegrable whipstock for casing exit tools, shear pins, dissolvable body locking rings, mud motor stators, progressive cavity pump stators, or shear screws; pumpable tools such as plugs, direct connect plugs, bridge plugs, wiper plugs, frac plugs, components of frac plugs, drill in sand control beaded screen plugs, inflow control device plugs, polymeric plugs, disappearing wiper plugs, cementing plugs, balls, diverter balls, shifting and setting balls, swabbing element protectors, buoyant recorders, pumpable collets, float shoes, or darts; tools that inhibit flow such as seals, high pressure beaded frac screen plugs, screen basepipe plugs, coatings for balls and seats, compression packing elements, expandable packing elements, O-rings, attached seals, bullet seals, sub-surface safety valve seals, sub-surface safety valve flapper seal, dynamic seals, V-rings, back up rings, drill bit seals, liner port plugs, atmospheric discs, atmospheric chamber discs, debris barriers, drill in stim liner plugs, inflow control device plugs, flappers, seats, ball seats, direct connect disks, drill-in linear disks, gas lift valve plug, fluid loss control flappers, electric submersible pump seals, shear out plugs, flapper valves, gaslift valves, or sleeves.

The isocyanate component of the invention includes di- or poly-functional isocyanates containing two or more —NCO groups per molecule. The isocyanate may include aliphatic, cycloaliphatic, polycyclic or aromatic isocyanate monomers. Further the isocyanate component may be monomeric, oligomeric, polymeric, prepolymer, and/or a blocked system. Examples of diisocyanate monomers useful in embodiments of the invention include 2,4'- and 4,4'-methylene-bis-(phenyl isocyanate) (MDI), 2,4'- and 2,6'-toluene diisocyanate (TDI), para-phenylene diisocyanate (PPDI), tolidene diisocyanate (TODI), naphthalene-1,5-diisocyanate (NDI), 1,6-hexane diisocyanate (HDI), dibenzyl-4,4'-diisocyanate, isophorone diisocyanate (IPDI), 1,3'- and 1,4'-xylene diisocyanates, 1,6-hexamethylene diisocyanate, 1,3'- and 1,4'-cyclohexyl diisocyanate (CHDI), the three geometric isomers of 1,1'-methylene-bis(4-isocyanatocyclohexane) ($H_{12}$MDI) and mixtures thereof.

The isocyanate-reactive component of at least one embodiment of the invention includes one or more compounds bearing an active hydrogen group. The active hydrogen groups includes hydroxyl, amino, and/or thiol functionalities. In one embodiment the isocyanate-reactive component comprises a chain-extender, cross-linker, and/or one or more polyols or any combinations thereof to prepare the urethane network. Polyols include compounds having more than one hydroxyl, amino, or thiol functional groups or combinations thereof. The formation of such polyols is well known in the art. Such polyols may contain ester, ether, amide, aliphatic, acrylic, polylactic acid, polyglycolic acid, metal, metalloid and other functionalities as also known to those skilled in the art. In various embodiments, the polyol may comprise one or more of polyether polyols, polyester polyols, polycarbonate polyols, polycaprolactone polyols, polyacrylate polyols, polylactic acid, polyglycolic acid, and polyols containing blocks of different types of esters, ethers, amides, and/or other repeating groups or segments, and mixtures or combinations thereof. In some embodiments the polyols have a molecular weight ranging from 100 to 10,000, in one embodiment, from 225 to 6,000, and in another embodiment from 250 to 3,000. In this context, molecular weight refers to the number average molecular weight in Daltons which as used herein is calculated via Hydroxyl number measurement by ASTM E222-94 method.

In various embodiments, the polyol may comprise glycols, triols, and/or higher average hydroxyl functionality and having molecular weights ranging, for example those including from 50 to 600, and in another embodiment from 55 to 300, and in another from 60 to 200. Such polyols may include in one embodiment lower molecular weight polyols. The average hydroxyl functionality can range from about 2 to 8, preferably about 2 to 3 and more preferably from about 2 to 2.5. Such glycols or triols may include, for example, ethylene glycol, isomers of propylene glycol, isomers of butanediol, isomers of pentanediol, isomers of hexanediol, trimethylolpropane, pentaerythritol, poly(tetramethylene ether) glycol, poly(trimethylene ether) glycol, diethylene glycol, triethylene glycol, dipropylene glycol, tripropylene glycol, and mixtures thereof.

In another embodiment of the invention the polyols useful for making prepolymer are compounds of the polyester polyol type. These polyols are prepared by conventional methods using a combination of diacids and diols that are known in the art, for example succinate, adipate or other esters. The esters may also be prepared by the condensation reaction of hydroxyl carboxylic acids, for example lactic or glycolic acids. Esters may also be prepared from acyl chlorides. Illustrative of the polyester polyols are poly(adipate) glycol, poly(hexamethylene adipate) glycol, poly(ethylene adipate) glycol (PEAG), poly(diethylene adipate) glycol, poly(ethylene/propylene adipate) glycol, poly(trimethylolpropane/hexamethylene adipate) glycol, poly(ethylene/butylene adipate) glycol, poly(butylene adipate) glycol, poly(hexamethylene/neopentyl adipate) glycol, poly(butylene/hexamethylene adipate) glycol (PBHAG), poly(neopentyl adipate) glycol, and mixtures, copolymers (including block and random copolymers) and terpolymers thereof.

In one embodiment the use of PEAG polyol with an aromatic diisocyanate as the isocyanate component.

The degrading-agent of this invention undergo reactions with the polyurethane matrix when exposed to aqueous, non-aqueous and/or thermal environments, which, degrade and/or disrupt the polyurethane network leading to a loss in material properties.

The degrading-agent includes compounds that are relatively stable in the presence of urethane raw materials and the processing conditions used to produce polyurethane networks. For example, in one embodiment the degrading-agent can be neutral or mildly acidic or basic during production of a urethane article and later form a stronger acidic or basic condition during use of the polyurethane article so as degrade the article more effectively.

In one embodiment of the invention, the degrading-agent is dispersed as a mixture or is covalently bound to the polymer. The degrading-agent, such as the anhydride or heterocyclic functional compound, may be added as a discrete compound or bound within the polymer matrix to degrade the polymer. When the polyurethane is exposed to an aqueous environment water diffuses into the polymer, which, reacts with the degrading-agent generating an active chemical species such as an acid or base that degrades or catalyzes the degradation of the polyurethane network, for example, the hydrolysis of an anhydride that generates a diacid, which, catalyzes degradation pathways. In a further embodiment of the invention the degrading-agent interacts with the urethane chemistry, for example reacting with a secondary nitrogen group in the urethane backbone disrupting the polyurethane network for example by disrupting the hard phase, reducing hydrogen bonding and/or generating an acid that leads to a loss in properties. The degrading-agent of at least one embodiment of the invention includes for example compounds that generate radicals when exposed to heat, which degrade the urethane network or cause main chain scission (for example peroxides and azo compounds that may generate both a radical as well as nitrogen gas).

In one embodiment, the degrading agent does not decomposes liberating carbon dioxide. In such embodiments, the anhydride is not used as a blowing agent to generates carbon dioxide and, subsequently, foam.

In one embodiment, the anhydrides and/or heterocyclic groups of the invention include, hexahydrophthalic anhydride (HHPA), maleic anhydride, pyromellitic dianhydride, 1,8-naphthalic anhydride, (2-Dodecen-1-yl)succinic anhydride, acetic anhydride, succinic anhydride, phthalic anhydride, propionic anhydride, methacrylic anhydride, glutaric anhydride, citraconic anhydride, butyric anhydride, isobutyric anhydride, 3,4,5,6-Tetrahydrophthalic anhydride, isatoic anhydride, diglycolic anhydride, itaconic anhydride, crotonic anhydride, trans1,2-Cyclohexanedicarboxylic anhydride, 2,3-dimethylmaleic anhydride, 2-carboxyphenylacetic anhydride, Hexahydro-4-methylphthalic anhydride, 3,3-Tetramethyleneglutaric anhydride, valeric anhydride, endo-Bicyclo[2.2.2]oct-5-ene-2,3-dicarboxylic anhydride, hexanoic anhydride, stearic anhydride, cis-Aconitic anhydride, trimellitic anhydride chloride, phenylsuccinic anhydride, 3,3-Dimethylglutaric anhydride, 2,2-dimethylglutaric anhydride, palmitic anhydride, 3,4-pyridinedicarboxylic anhydride, oleic anhydride, bromomaleic anhydride, 4-methylphthalic anhydride, S-acetylmercaptosuccinic anhydride, dodecanioc anhydride, 2-Octen-1-ylsuccinic anhydride, diphenic anhydride, decanoic anhydride, myristic anhydride, N-Methylisatoic anhydride, 2,2-Dimethylsuccinic anhydride, 3-Methylglutaric anhydride, phenylmaleic anhydride, 4-amino-1,8-naphthalic anhydride, 4,4-(4,4'-Isopropylidenediphenoxy)bis(phthalic anhydride), tetrachlorophthalic anhydride, tetrabromophthalic anhydride, 3-Hydroxyphthalic anhydride, tetrafluorophthalic anhydride, 4-Bromo-1,8-naphthalic anhydride, dodecenylsuccinic anhydride, 4,4'-(Hexafluoroisopropylidene)diphthalic anhydride, 3-Nitrophthalic anhydride, 4,4'-oxydiphthalic anhydride, 2,3-dichloromaleic anhydride, 2,3-Pyrazinedicarboxylic anhydride, 4-nitrophthalic anhydride, Polymer-bound Isatoic anhydride, 3,6-dichlorophthalic anhydride, trifluoroacetic anhydride, benzoic anhydride, boric anhydride, 1,2,3,6-tetrahydrophthalic anhydride, trimethylacetic anhydride, methanesulfonic anhydride, 1,2,4-Benzentricarboxylic anhydride, isobutyric anhydride, methyltetrahydrophthalic anhydride, glycine anhydride, cis-5-Norbornene-endo-2,3-dicarboxylic anhydride, 1,2-Cyclohexanedicarboxylic anhydride, dodecenylsuccinic anhydride, glutaric anhydride, butylsuccinic anhydride, 1,2-cyclopentanedicarboxylic anhydride, phenoxyacetic anhydride, Polypropylene-graft-maleic anhydride, polyethylene-graft-maleic-anhydride, polystyrene-block-poly(ethylene-ran-butylene)-block-polystyrene-graft-maleic anhydride, Poly(methyl vinyl ether-alt-maleic anhydride), polyisoprene-graft-maleic anhydride, cyclobutane-1,2,3,4-tetracarboxylic dianhydride, methyl nadic anhydride, and the like and mixtures thereof.

The specific amount of degrading-agent needed varies upon the degree of degradation desired and the nature of the anhydride or heterocyclic compound used. However, the amount should be sufficient to effect an increase in the degradation of the polyurethane as compared with an analogous polyurethane formed without the degrading-agent. Degradation can be comparatively quantified as one or more of the following attributes of a polyurethane composition: a decrease in (i) mechanical properties (e.g., hardness, tensile strength, elongation, sealing pressure), (ii) soluble fraction, (ii) liquid fraction, or (ii) solid fraction wherein the solid fraction may fracture into small pieces. In another embodiment degrading-agent is present in an amount of about 0.20 to about 30 wt %, based on total isocyanate plus isocyanate-reactive component, in another embodiment about 5 to 25 wt %, and in another embodiment about 5 to 20 wt %. In aqueous and non-aqueous environments the addition of a salt accelerates the rate of degradation.

In at least one embodiment, the preparation of the polyurethanes and polyurethane-ureas involves the preparation of a prepolymer. For example, the isocyanates are reacted with a long chain (high molecular weight) polyols to produce a prepolymer containing free isocyanate groups. This prepolymer may then be chain extended with a short chain (low molecular weight) polyol or diamine to form a polyurethane or polyurethane-urea There is no particular restriction on the use of prepolymer, or mixture of prepolymers, in the present invention, nor is there a particular restriction on the polyols or diisocyanate monomers that can be used in the preparation of the prepolymer. Broadly, polyurethanes are often two-phase polymers comprising alternating rigid and flexible blocks, or so-called hard and soft segments. Soft segments are obtained by the prepolymer where the polyol moieties primarily contribute to the elastic nature of the product. Hard segments, on the other hand, consist of the isocyanate and chain extender (usually an aromatic diamine or an aliphatic diol). They particularly affect the modulus, hardness and tear strength, and determine the upper use temperature by their ability to remain associated at elevated temperatures.

Degradable polyurethane in accord with an embodiment of the invention is obtainable by mixing a polyurethane prepolymer and a degrading-agent thereby forming a "modified prepolymer" and curing the modified polymer with a chain extender, such as in one embodiment in which an anhydride or heterocyclic compound are used as a degrading-agent. It should be appreciated by those skilled in the art, that one could also prepare polyurethane compositions according to the invention by processes in which all ingredients are mixed simultaneously for example using a three-component meter-mix machine or hand-batching process.

The polyurethane and the prepolymers of the invention are made using standard reaction processes and conditions as known in the art for the production of prepolymers and polyurethane generally. Illustrative processes are described by way of example in U.S. Pat. Nos. 4,832,098, 4,934,425, 4,921,029, 4,784,201, and 5,605,657, and US2003/065124, the contents of which are hereby incorporated by reference.

In one embodiment, the polyurethane according of the present invention can be made through a multi-step or one-shot casting process. Subsequently, a degrading-agent is added to the prepolymer and then the resulting modified prepolymer is cured with a chain extender. A casting process may be utilized in which the curing between the prepolymer and chain extender is performed in a mold. After curing the polyurethane is demolded and subsequently post-cured with additional heat and time so as to fully realize the physical properties of the polyurethane's network structure.

The prepolymer of one embodiment of the invention is typically prepared using an excess of diisocyanate monomers resulting in a prepolymer mixture containing unreacted monomer or "free" diisocyanate. The amount of free diisocyanate may be reduced to form a low-free monomer prepolymer. Such low free monomer prepolymers and methods for their preparation are also known in the art, for example by way of distillation. Any distillation equipment that can be efficiently operated at deep vacuum, moderate temperature, and short residence time can be used in this step (see for example US2003/065124). In an embodiment of the invention a low free monomer prepolymer is used having a 0.01-10.0 w %, e.g., 0.05-5.0 wt %, and in one embodiment less than 0.1 wt % of free diisocyanate component, which is not reacted with the polyol.

Generally, the prepolymers obtained by the process of the present invention can have low viscosities, low monomeric diisocyanate levels, and high NCO contents, for example above about 60%, preferably above about 80% or more of the theoretical NCO content for the ABA structure.

As used herein an isocyanate-reactive compound is a compound that links multiple isocyanate chains in the formation of polyurethane or polyurethane-urea. The isocyanate-reactive compound may include a chain extender, cross-linker, and/or polyol or combinations thereof. Broadly a chain extender is a material having two isocyanate-reactive groups per molecule. A cross-linker is a compound having more than two isocyanate-reactive groups per molecule. A polyol has one or more repeating segments and two or more isocyanate-reactive groups per molecule. The isocyanate-reactive groups includes but is not limited to active hydrogen groups such as hydroxyl, amino or thiol groups.

The chain extenders can, for example, be water, aliphatic diols, aromatic diamines, or their mixtures. Chain extenders may be the same or different as the isocyanate-reactive component of the invention.

Representative chain extenders include aliphatic diols, such as 1,4-butanediol (BDO), resorcinol di (beta-hydroxyethyl) ether (HER), resorcinol di(beta-hydroxypropyl) ether (HPR), hydroquinone-bis-hydroxyethyl ether (HQEE), 1,3-propanediol, ethylene glycol, 1,6-hexanediol, and 1,4-cyclohexane dimethanol (CHDM); aliphatic triols and tetrols, such as trimethylol propane; and adducts of propylene oxide and/or ethylene oxide having molecular weights in the range of from about 190 to about 500.

Numerous diamines are well known chain extenders for polyurethane compositions. Preferred diamine chain extenders include 4,4'-methylenebis(o-chloroaniline) (MOCA), 4,4'-methylenebis(2-chloroaniline) (MBCA); 4,4'-methylenebis(3-chloro-2,6-diethylaniline (MCDEA); diethyl toluene diamine (DETDA); tertiary butyl toluene diamine (TBTDA); dimethylthio-toluene diamine; trimethylene glycol di-p-amino-benzoate; methylenedianiline (MDA); and methylenedianiline-sodium chloride complex.

In one embodiment the chain extender is an amine curative and in case the amine curative is 4,4'-methylenebis(o-chloroaniline) (MOCA).

For curing (chain extending) prepolymers of the present invention with amine curatives, the number of —NH$_2$ groups in the diamine component should be approximately equal to the number of —NCO groups in the prepolymer. In one embodiment there is used from about 80 to about 120% of a stoichiometric equivalent and in another embodiment there is used about 85 to about 105%. However, it is also known that much higher stoichiometries may be used. The reactivity of isocyanate groups with amino groups varies according to the structure to which the groups are attached. As is well known, as for example in U.S. Pat. No. 2,620,516, some amines react very rapidly with some isocyanates while others react more slowly. In the latter case, it is optional to use catalysts to cause the reaction speed to increase. For some of the aromatic diamines, the temperature of the reaction or of the polyurethane reactant will need only be controlled in order to obtain the proper reaction time; thus, for a diamine that ordinarily would be too reactive, a catalyst would obviously be unnecessary, a lowering of the reaction temperature would suffice. A great variety of catalysts is available commercially for accelerating the reaction of the isocyanate groups with compounds containing active hydrogen atoms. It is well within the skill of the technician in this field to pick and choose catalysts to fit her particular needs or desires and adjust the amounts used to further refine her conditions. Adipic acid and triethylene diamine are typical of suitable catalysts.

The curing temperature employed for chain extending a modified prepolymer can vary, but will typically be greater than 20° C., e.g., greater than 50° C. or greater than 70° C. In one embodiment polyurethane can be made by extending the chains of the modified prepolymers formed with prepolymer having low monomeric diisocyanate content with the above chain extenders by methods known in the art.

Anhydrides can be incorporated within a urethane and/or urea polymer matrix with minimal interactions or reactions with an isocyanate and/or curative at concentrations, times and temperatures that are useful for preparing degradable polymers, manufacturing articles, and exposing the network to conditions that degrade the properties. Without wishing to be bound to any particular theory, it is understood that the cured polymer contains unreacted anhydride and/or heterocyclic groups that undergo hydrolysis when exposed to moisture or other reactions with the polymer matrix when exposed to aqueous, non-aqueous and thermal environments generating an acid, base or other chemical interactions that degrade and/or disrupt the polymer network.

In an embodiment of this invention a reaction rate (kNCO-CUR) between the isocyanate and curative is greater than the kinetics (kNCO-ANH) of any side-reactions between the isocyanate group and the anhydride or heterocyclic degrading-agent compound; and the kinetics (kCUR-ANH) of any side-reactions between the chain extender and anhydride or heterocyclic compound. This favors the formation of a urethane network during the curing process with minimal reactions between the isocyanate, chain extender and anhydride or heterocyclic compound.

The polymer described within this invention has unreacted anhydride or heterocyclic compounds dispersed within the matrix in a desirable concentration to undergo reactions when exposed to aqueous, non-aqueous and/or thermal environments that lead to degradation mechanisms and a loss in properties after a desired service life. The rate at which the isocyanate and curative react is faster than the rate of any side-reactions that occur between the urethane reagents and anhydride. Side reactions between urethane reagents and anhydride impact the stoichiometry, network structure, and morphology; generate undesirable by-products that cause bubbles in parts; and reduce the properties of the polymer.

It may be desirable to vary the chemistry, chemical interactions, and reaction rates of the isocyanate, chain extender and/or degrading-agent to modulate the properties of the urethane network for a specific application. For example, the incorporation of free unreacted anhydride within the polymer allows for easier diffusion and mobility of the chemical species in the solid state that enable degradation pathways. In one embodiment, the polyurethane was formed in a process in which anhydrides are solid state at room temperature and a liquid state (melted) at the desired degradation temperature to improve diffusion within the polymer matrix. The skilled artisan may consider the impact that the anhydride chemical structure will have on solubility, steric effects and reaction kinetics. In one embodiment, anhydrides with low water solubility were incorporated into the polymer matrix that effectively degraded the network. The effectiveness of anhydrides that exhibit low water solubility was surprising because it was thought that anhydrides were needed that exhibit high water solubility to generate sufficient free-acid to degrade the urethane network.

In one embodiment, there is a two-step reaction where a degrading-agent is mixed into a urethane network with generation of bubbles in the cast article. In aqueous environments water diffuses into the cured urethane network containing unreacted anhydride degradation agent. The anhydride hydrolyzes generating an acid that catalyzes the hydrolysis of the ester groups leading to scission of the polymer backbone, degradation, and the generation of soluble fragments. A two-step reaction in an aqueous environment allows the preparation of essentially void free articles and parts that degrade after the desired service life. This facilitate the use of common hot cast open molding techniques.

Although the preferred embodiments of the present invention are described herein, it is to be understood that the invention is not limited to that precise embodiment, and that various other changes and modifications may be affected therein by one skilled in the art without departing from the scope or spirit of the invention. The following examples are illustrative of a practice of the invention, but are not meant to be considered as limiting the scope of the invention.

EXAMPLES

The following compositions were prepared.

Example 1

A degradable polyurethane composition was prepared from a TDI terminated polyester prepolymer, 14 wt % HHPA, and MOCA. A low-free TDI terminated polyester prepolymer based on poly(ethylene adipate) glycol having an NCO content of 5.47 wt % (214.57 grams) was heated to 56° C. and mixed with 1,2-cyclohexanedicarboxylic anhydride (35.81 grams). The mixture was degassed for approximately 5 minutes under vacuum (less than 10 mm Hg). There was very little to no change in the color of the prepolymer when the anhydride was added. 4,4'-methylenebis(2-chloroaniline) was melted at approximately 125° C. and degassed for 5 minutes under vacuum (less than 10 mm Hg). 4,4'-methylenebis(2-chloroaniline) (35.69 grams) was added to the prepolymer and mixed until uniform. The molar ratio of the curative to isocyanate was 95% of the theoretical stoichiometric amount. The mixture was poured into a hot mold in an oven at 100° C. The urethane was cured for one-hour then post-cured for an additional 16 hours at 100° C. The cured polymer was bubble-free and had a 90A shore hardness. A rectangular specimen was immersed in water at 80° C. Cracks appeared within one-day and the sample began breaking into pieces after three days. Immersion and heat aging data is shown below. Nearly 45 wt % of the urethane polymer dissolved into the aqueous phase within 15 days. The remaining polymer fractured into small pieces. In the non-aqueous fluid (Perchem 1150) at 120° C., the hardness of the specimen dropped 100% in three days. The hardness of specimen heat aged at 120° C. decreased 100% in three days.

TABLE 1

TDI-Ester-MOCA-HHPA, 90A, 95% Stoichiometry,
Degradable Polyurethane, 14 wt % Anhydride

| | | 80° C. water immersion | | | | |
|---|---|---|---|---|---|---|
| Hours | Days | Mass 6.67 mm | Percent 6.67 mm | Pieces # | Crack observed | Tack |
| 0.00 | 0.0 | 3.7507 g | 0.00% | 1 | No | None |
| 22.70 | 0.9 | 3.8404 g | 2.39% | 1 | Yes | None |
| 30.00 | 1.3 | 3.8140 g | 1.69% | 1 | Yes | None |
| 51.13 | 2.1 | 3.7141 g | −0.89% | 1 | Yes | None |
| 75.28 | 3.1 | 3.5711 g | −4.79% | 3 | Yes | None |
| 147.35 | 6.1 | 3.1647 g | −15.62% | 8 | Yes | None |
| 173.15 | 7.2 | 3.0120 g | −19.69% | 11 | — | Slight |
| 195.28 | 8.1 | 2.8972 g | −22.76% | 11 | — | Slight |
| 239.57 | 10.0 | 2.6338 g | −29.78% | 12 | — | Slight |
| 314.18 | 13.1 | 2.2772 g | −39.29% | 12 | — | None |
| 340.45 | 14.2 | 2.1795 g | −41.89% | 12 | — | None |
| 362.87 | 15.1 | 2.1177 g | −43.54% | 14 | — | None |
| 480.02 | 20.0 | 1.8770 g | −49.96% | 13 | — | None |
| 701.57 | 29.2 | 1.6789 g | −55.24% | 15 | — | None |

Example 2

A degradable polyurethane composition was prepared from a TDI terminated polyester prepolymer, 12 wt %

HHPA, and MOCA. A low-free TDI terminated polyester prepolymer based on poly(ethylene adipate) glycol having an NCO content of 5.47 wt % (214.58 grams) was heated to 55° C. and mixed with 1,2-cyclohexanedicarboxylic anhydride (30.68 grams). The mixture was degassed for approximately 5 minutes under vacuum (less than 10 mm Hg). There was very little to no change in the color of the prepolymer when the anhydride was added. The absence of a color change suggest there is very little to no interaction between the isocyanate and anhydride. 4,4'-methylenebis(2-chloroaniline) was melted at approximately 125° C. and degassed for 5 minutes under vacuum (less than 10 mm Hg). 4,4'-methylenebis(2-chloroaniline) (35.75 grams) was added to the prepolymer and mixed until uniform. The molar ratio of the curative to isocyanate was 95% of the theoretical stoichiometric amount. The mixture was poured into a hot mold in an oven at 100° C. The urethane was cured for one-hour then post-cured for an additional 16 hours at 100° C. The cured polymer was bubble-free and had a 91-93A shore hardness. A rectangular specimen was immersed in water at 80° C. Cracks appeared within one-day and the sample began breaking into pieces after five days in water. Immersion and heat aging data is shown below. Nearly 45 wt % of the urethane polymer dissolved into the aqueous phase within 15 days. The remaining polymer fractured into small pieces. In the non-aqueous fluid (Perchem 1150) at 120° C., the hardness of the specimen dropped 100% in six days. The hardness of specimen heat aged at 120° C. decreased 100% in three days.

TABLE 2

TDI-Ester-MOCA-HHPA, 91A, 95% Stoichiometry,
Degradable Polyurethane, 12 wt % Anhydride

| | | | 80° C. water immersion | | | |
|---|---|---|---|---|---|---|
| Hours | Days | Mass 6.67 mm | Percent 6.67 mm | Pieces # | Crack observed | Tack |
| 0.00 | 0.0 | 3.8700 g | 0.00% | 1 | No | None |
| 3.83 | 0.2 | 3.9302 g | 1.56% | 1 | No | None |
| 22.08 | 0.9 | 3.9824 g | 2.90% | 1 | Yes | None |
| 51.23 | 2.1 | 3.8410 g | −0.75% | 1 | Yes | Slight |
| 118.50 | 4.9 | 3.5338 g | −8.69% | 5 | Yes | None |
| 142.80 | 5.9 | 3.3833 g | −12.58% | 10 | Yes | None |
| 166.53 | 6.9 | 3.2294 g | −16.55% | 15 | Yes | None |
| 190.85 | 8.0 | 3.0765 g | −20.50% | 16 | — | None |
| 218.75 | 9.1 | 2.9112 g | −24.78% | 17 | — | None |
| 287.75 | 12.0 | 2.5717 g | −33.55% | 19 | — | None |
| 334.35 | 13.9 | 2.3015 g | −40.53% | 20 | — | None |
| 362.47 | 15.1 | 2.1895 g | −43.42% | 20 | — | None |
| 386.57 | 16.1 | 2.1117 g | −45.43% | 24 | — | None |
| 446.72 | 18.6 | 1.9298 g | −50.13% | 24 | — | None |
| 484.60 | 20.2 | 1.8907 g | −51.14% | 25 | — | None |
| 506.72 | 21.1 | 1.8588 g | −51.97% | 25 | — | None |
| 551.00 | 23.0 | 1.7873 g | −53.82% | 20 | — | None |
| 625.52 | 26.1 | 1.6660 g | −56.95% | 23 | — | None |
| 651.75 | 27.2 | 1.6323 g | −57.82% | 22 | — | None |
| 674.33 | 28.1 | 1.6372 g | −57.70% | 30 | — | None |
| 791.45 | 33.0 | 1.5801 g | −59.17% | 25 | — | None |
| 1012.87 | 42.2 | 1.5706 g | −59.42% | 25 | — | None |

Example 3

A degradable polyurethane composition was prepared from a TDI terminated polyester prepolymer, 16 wt % HHPA, and MOCA. A low-free TDI terminated polyester prepolymer based on poly(ethylene adipate) glycol having an NCO content of 5.47 wt % (214.6 grams) was heated to 60° C. and mixed with 1,2-cyclohexanedicarboxylic anhydride (40.92 grams). The mixture was degassed for approximately 5 minutes under vacuum (less than 10 mm Hg). There was very little to no change in the color of the prepolymer when the anhydride was added. 4,4'-methylenebis(2-chloroaniline) was melted at approximately 125° C. and degassed for 5 minutes under vacuum (less than 10 mm Hg). 4,4'-methylenebis(2-chloroaniline) (35.65 grams) was added to the prepolymer and mixed until uniform. The molar ratio of the curative to isocyanate was 95% based on the theoretical stoichiometric amount. The mixture was poured into a hot mold in an oven at 100° C. The urethane was cured for one-hour then post-cured for an additional 16 hours at 100° C. The cured polymer contained some bubbles and had a 88A shore hardness. A rectangular specimen was immersed in water at 80° C. Cracks appeared within one-day and the sample began breaking into pieces within five days. Immersion and heat aging data is shown below. Nearly 45 wt % of the urethane polymer dissolved into the aqueous phase within 15 days. The remaining polymer fractured into small pieces. In the non-aqueous fluid (Perchem 1150) at 120° C., the hardness of the specimen dropped 100% in three days. The hardness of specimen heat aged at 120° C. decreased 100% in one day.

TABLE 3

TDI-Ester-MOCA-HHPA, 88A, 95% Stoichiometry,
Degradable Polyurethane, 16 wt % Anhydride

| | | | 80° C. water immersion | | | |
|---|---|---|---|---|---|---|
| Hours | Days | Mass 6.67 mm | Percent 6.67 mm | Pieces # | Crack observed | Tack |
| 0.0 | 0.0 | 3.6968 g | 0.00% | 1 | No | None |
| 18.03 | 0.8 | 3.7836 g | 2.35% | 1 | Yes | None |
| 41.97 | 1.7 | 3.6266 g | −1.90% | 1 | Yes | None |
| 113.70 | 4.7 | 3.3012 g | −10.70% | 5 | Yes | None |
| 143.98 | 6.0 | 3.0772 g | −16.76% | 5 | Yes | None |
| 169.00 | 7.0 | 2.9217 g | −20.97% | 17 | Yes | None |
| 187.27 | 7.8 | 2.8100 g | −23.99% | 23 | Yes | None |
| 216.43 | 9.0 | 2.6766 g | −27.60% | 24 | Yes | None |
| 283.72 | 11.8 | 2.3279 g | −37.03% | 27 | Yes | None |
| 308.02 | 12.8 | 2.2190 g | −39.98% | 24 | Yes | None |
| 331.75 | 13.8 | 2.1592 g | −41.59% | 27 | Yes | None |
| 356.05 | 14.8 | 2.0584 g | −44.32% | 25 | — | None |
| 384.10 | 16.0 | 1.9711 g | −46.68% | 18 | — | None |
| 452.87 | 18.9 | 1.7757 g | −51.97% | 33 | — | None |
| 527.80 | 22.0 | 1.6518 g | −55.32% | 20 | — | None |
| 551.93 | 23.0 | 1.6124 g | −56.38% | 43 | — | None |
| 612.00 | 25.5 | 1.5486 g | −58.11% | 42 | — | None |
| 649.80 | 27.1 | 1.5475 g | −58.14% | 25 | — | None |
| 671.93 | 28.0 | 1.5112 g | −59.12% | 25 | — | None |
| 716.28 | 29.8 | 1.3656 g | −63.06% | 25 | — | None |
| 790.82 | 33.0 | 1.3204 g | −64.28% | 50 | — | None |
| 956.67 | 39.9 | 1.3317 g | −63.98% | — | — | — |
| 1178.17 | 49.1 | 1.2405 g | −66.44% | — | — | — |

Example #4

An 88-89A polyurethane composition was prepared from a TDI terminated polyester prepolymer cured with MOCA using three different stoichiometric ratios (90%, 100%, & 110% respectively) to baseline the degradation rate of the polymer without adding any anhydride. A low-free TDI terminated polyester prepolymer based on poly(ethylene adipate) glycol having an NCO content of 4.27 wt % (222.80, 220.12, and 217.54 grams) was heated to approximately 90° C. and degassed under vacuum for 5 minutes (less than 10 mm Hg). 4,4'-methylenebis(2-chloroaniline) was melted at approximately 125° C. and degassed for 5 minutes under vacuum (less than 10 mm Hg). 4,4'-methylenebis(2-chloroaniline) (27.43, 29.65 & 32.47 grams respectively) was added to the prepolymer and mixed until uniform. The mixture was poured into a hot mold in an oven at 105° C. The urethane was cured for one-hour then post-cured for an additional 16 hours at 105° C. The cured polymer was bubble-free and had an 88 to 89 A shore hardness. A rectangular specimen was immersed in water at 80° C. Cracks appeared in one set of specimens after twenty-one days. There was less than 2% weight loss after 14 days. Water immersion data is shown below. The addition of an anhydride accelerated the degradation dramatically.

Example 5

A degradable polyurethane composition was prepared from a TDI terminated polyester prepolymer, 20 wt % HHPA, and MOCA. A low-free TDI terminated polyester prepolymer based on poly(ethylene adipate) glycol having an NCO content of 5.47 wt % (214.62 grams) was heated to 90° C. and mixed with liquid 1,2-cyclohexanedicarboxylic anhydride (50.0 grams). The mixture was degassed for approximately 10 minutes under vacuum (7 mm Hg). There mixture was clear and bubble-free. There was no change in the color of the prepolymer when the anhydride was added. 4,4'-methylenebis(2-chloroaniline) was melted at approximately 125° C. and degassed for 5 minutes under vacuum (less than 10 mm Hg). 4,4'-methylenebis(2-chloroaniline) (35.31 grams) was added to the prepolymer and mixed until uniform. The molar ratio of the curative to isocyanate was 95% based on the theoretical stoichiometric amount. The mixture was poured into a hot mold in an oven at 100° C. The urethane was cured for one-hour then post-cured for an additional 16 hours at 100° C. The cured polymer was an opaque white color, which should have been a semi-transparent beige color, and contained numerous bubbles (like a high density foam). The cured polymer had a 74A shore hardness. The polymer was expected to have a hardness between 90 to 95 A. The specimen was not immersed.

Example 6

A degradable polyurethane composition was prepared from a TDI terminated polyester prepolymer, 20 wt % HHPA, and E300. A low-free TDI terminated polyester prepolymer based on poly(ethylene adipate) glycol having an NCO content of 5.47 wt % (220.78 grams) was heated to 61° C. and mixed with 1,2-cyclohexanedicarboxylic anhydride (50.0 grams) that was heated to 49° C. to melt the anhydride. The mixture was degassed for approximately 4 minutes under vacuum (8 mm Hg). There mixture was clear and bubble-free. There was no change in the color of the prepolymer when the anhydride was added. This suggests that there is little to no interaction between the anhydride and isocyanate at these processing temperatures. Dimethyl-thiotoulenediamine (29.21 grams) at 25° C. was added to the prepolymer and mixed until uniform. The molar ratio of the curative to isocyanate was 95% based on the theoretical stoichiometric amount. There was no change in the color of the prepolymer and anhydride mixture after the aromatic curative was added. This suggests that there is little to no molecular interactions between the anhydride and curative at this processing temperature. The mixture was poured into a hot mold in an oven at 100° C. Small microbubbles appeared within the gelled polymer after five minutes at 100° C. The urethane was cured for one-hour then post-cured for an additional 16 hours at 100° C. The cured polymer was semi-transparent (amber color) and contained bubbles. The cured polymer had an 83 A shore hardness, which, was expected to be between 90 to 95 A. The specimen was not immersed.

Example 7

A degradable polyurethane composition was prepared from a TDI terminated polyester prepolymer, 20 wt % HHPA, and E300 using a three-step cure schedule to eliminate bubbles from side-reactions with the anhydride. A low-free TDI terminated polyester prepolymer based on poly(ethylene adipate) glycol having an NCO content of 5.47 wt % (220.78 grams) was heated to 52° C. and mixed with 1,2-cyclohexanedicarboxylic anhydride (50.0 grams) that was heated to 42° C. to melt the anhydride. The mixture was degassed for approximately 10 minutes under vacuum (3 to 5 mm Hg). There mixture was clear and bubble-free. There was no change in the color of the prepolymer when the anhydride was added. This suggests that there is little to no interaction between the anhydride and isocyanate at these processing temperatures. Dimethylthiotoulenediamine (29.21 grams) at 25° C. was added to the prepolymer and mixed until uniform. The molar ratio of the curative to isocyanate was 95% based on the theoretical stoichiometric amount. There was no change in the color of the prepolymer and anhydride mixture after the aromatic curative was added. This suggests that there is little to no molecular interactions between the anhydride and curative at this processing temperature. The mixture was poured into a mold at 25° C. and cured for one hour. The mold was placed in an oven at 60° C. for one hour. No bubbles or color change was observed. The mold was placed in an oven for 15 hours at 100° C. The cured polymer was a semi-opaque amber color that contained no bubbles. The cured polymer had a hardness of 95 A, which was the expected value.

Example 8

A degradable polyurethane composition was prepared from a TDI terminated polyester prepolymer, 20 wt % maleic anhydride, and E300 to examine the impact that an anhydride has with increased water solubility and less steric effects. A low-free TDI terminated polyester prepolymer based on poly(ethylene adipate) glycol having an NCO content of 5.47 wt % (220.71 grams) was heated to 47° C. and mixed with maleic anhydride (50.00 grams) that was heated to 75° C. to melt the anhydride. The prepolymer color changed from a slight amber to a clear yellow, which indicates there's an interaction between the anhydride and isocyanate. The mixture was degassed for approximately 10 minutes under vacuum (11 to 5 mm Hg). The prepolymer mixture was a clear bubble-free yellow color. Dimethylth-iotoulenediamine (29.21 grams) at 25° C. was added to the prepolymer and mixed until uniform. The molar ratio of the curative to isocyanate was 95% based on the theoretical stoichiometric amount. The prepolymer mixture immediately changed color turning a clear dark red when the aromatic amine was added, which, suggests there is a strong molecular interaction between the anhydride and aromatic curative at this processing temperature. The mixture was poured into a mold at 100° C. The polymer gelled after 10 minutes at 100° C., however, there were no bubbles present. Micro bubbles appeared after 15 minutes. The urethane was cured for one hour and. and post cured 16 hours at 100° C. The cured polymer was a clear dark reddish brown color that contained numerous bubbles throughout the network. The bubbles were a few millimeters in diameter. The cured urethane had a hardness of 70 A. The hardness was expected to be between 90 and 95 A. Maleic anhydride has a strong interaction with TDI and dimethylthiotouluenediamine.

Example 9

A low-free TDI terminated succinate ester prepolymer was prepared from TDI, poly(ethylene succinate)glycol, and diethylene glycol to increase the degradation kinetics. TDI-65 (1525 grams), phosphoric acid (0.0449 grams), poly (ethylene succinate)glycol (2817 grams) and diethylene glycol (163 grams) were charged into a reactor to synthesize crude prepolymer. The crude prepolymer was stripped in a thin film evaporator at elevated temperature and vacuum. The stripped prepolymer had an NCO value of 5.38 wt %.

Example 10

A degradable polyurethane composition was prepared from the TDI terminated polyester prepolymer prepared in example 9, 12 wt % HHPA, and MOCA. A low-free TDI terminated polyester prepolymer based on poly(ethylene succinate) glycol having an NCO content of 5.38 wt % (150.57 grams) was heated to 68° C. and mixed with 1,2-cyclohexanedicarboxylic anhydride (21.14 grams). The mixture was degassed for approximately 10 minutes under vacuum (less than 10 mm Hg). There was very little to no change in the color of the prepolymer when the anhydride was added. The absence of a color change suggest there is very little to no interaction between the isocyanate and anhydride. 4,4'-methylenebis(2-chloroaniline) was melted at approximately 125° C. and degassed for 5 minutes under vacuum (less than 10 mm Hg). 4,4'-methylenebis(2-chloroaniline) (24.46 grams) was added to the prepolymer and mixed until uniform. The molar ratio of the curative to isocyanate was 95% of the theoretical stoichiometric amount. The mixture was poured into a hot mold in an oven at 100° C. The urethane was cured for one-hour then post-cured for an additional 16 hours at 100° C. The cured polymer was bubble-free and had a 97A shore hardness. A rectangular specimen was immersed in water at 80° C. Cracks appeared within one-day and the sample began breaking into pieces after six days. Water immersion data is shown below. Nearly 35 wt % of the urethane polymer dissolved into the aqueous phase within 7 days. The remaining polymer easily fractured into small pieces.

Example 11

A degradable polyurethane composition was prepared from an MDI terminated polyester prepolymer, 10 wt % maleic anhydride, and 1,4-butanediol. An MDI terminated polyester prepolymer based on poly(ethylene adipate) glycol having an NCO content of 9.57 wt % (227.82 grams) was heated to 70° C. and mixed with melted maleic anhydride (25.5 grams). 230.76 grams of the prepolymer/anhydride mixture was transferred to a second container and degassed for approximately 25 minutes under vacuum (>2 mm Hg). 1,4-butanediol (20.46 grams) at 25° C. was added to the prepolymer and mixed until uniform. The molar ratio of the curative to isocyanate was 95%. The mixture was poured into a mold at 100° C. The urethane was cured for one hour at 100° C. followed by a 16 hour post cure at 100° C. The cured urethane had a hardness of 90 A. There were no bubbles in the molded part.

Example 12

A degradable polyurethane composition was prepared using an MDI terminated polyester prepolymer based on poly(ethylene adipate) glycol having an NCO content of 6.71 wt % (187.28 grams); 10 wt % maleic anhydride (25.15 grams); and 1,4-butanediol (12.93 grams) with and without 10 wt % sodium chloride (25.34 grams). The hardness of specimen with sodium chloride immersed in Perchem 1150 (non-aqueous fracking fluid) at 120° C. decreased 100% in one day where the specimen without sodium only decreased about 50% in three days.

Example 13

A degradable polyurethane composition was prepared from an MDI terminated polyester prepolymer, 20 wt % pyromellitic dianhydride, and 1,4-butanediol. An MDI terminated polyester prepolymer based on poly(ethylene adipate) glycol having an NCO content of 9.57 wt % (227.82 grams) was heated to 85° C. and mixed with pyromellitic dianhydride powder (50.95 grams). 258.2 grams of the prepolymer/anhydride mixture was transferred to a second container and degassed for approximately 15 minutes under vacuum (>2 mm Hg). 1,4-butanediol (20.6 grams) at 25° C. was added to the prepolymer and mixed until uniform. The molar ratio of the curative to isocyanate was 95%. The mixture was poured into a mold at 100° C. The urethane was cured for one hour at 100° C. followed by a 16 hour post cure at 100° C. The cured urethane had a hardness of 95 A. No bubbles were observed in the molded part.

Example 14

A degradable polyurethane composition was prepared from a MDI terminated polyester prepolymer, 10 wt % maleic anhydride, and HQEE. A low-free MDI terminated polyester prepolymer based on poly(ethylene adipate) glycol having an NCO content of 3.41 wt % (185.41 grams) was heated to 87° C. and mixed with maleic anhydride (19.95 grams). The mixture was degassed for approximately 10 minutes under vacuum (>2 mm Hg), Melted HQEE (14.71 grams) at 120° C. was added to the 100° C. prepolymer and mixed until uniform. The molar ratio of the curative to isocyanate was 95%. The mixture was poured into a mold at 120° C. The urethane was cured for one hour at 120° C. followed by a 16 hour post cure at 120° C. The cured urethane had a hardness of 89 A. No bubbles were observed in the molded part.

What is claimed is:

1. A polyurethane-forming composition, comprising, based on total weight of the polyurethane-forming composition:
   (A) a pre-polymer in a range of from 72 to 84 wt. %, the pre-polymer comprising, in reacted form:
      (a) an isocyanate component comprising toluene diisocyanate (TDI) and/or methylene-bis-(phenyl isocyanate) (MDI); and
      (b) a polyol, comprising poly (trimethylolpropane/hexamethylene adipate) glycol, having a number average molecular weight in a range of from 50 to 600;
   (B) a degrading-agent, comprising hexahydrophthalic anhydride (HHPA) and/or maleic anhydride, in a range of from 9 to 20 wt. %; and
   (C) a chain extender, comprising a hydroquinone-bishydroxyethyl ether (HQEE), dimethylthio-toluene diamine, 1,4-butanediol, and/or 4,4'-methylenebis(o-chloroaniline) (MOCA), in a range of from 6 to 13 wt. %; and
   (D) optionally, an additive,
wherein a stoichiometric equivalent of the isocyanate component (a) to the polyol (b) is in a range of from 80 to 120%, wherein the prepolymer has a free monomer content in the range of from 0.05 to 5.0 wt %, based on the total prepolymer weight wherein the pre-polymer (A) has an NCO content in a range of from 3.41 to 9.57 wt. %, and wherein, the pre-polymer (A), when cured by the chain extender (C), forms a cured urethane network comprising ester groups, and the degrading-agent (B) is mixed in the cured urethane network, and wherein, in an aqueous environment, the degrading-agent (B) comprising the hexahydrophthalic anhydride (HHPA) and/or the maleic anhydride hydrolyzes to generate an acid that catalyzes a hydrolysis of the ester groups in the cured urethane network, leading to polymer backbone scission, degradation, and generation of soluble fragments.

2. The composition of claim 1, wherein the stoichiometric equivalent of the isocyanate component (a) to the polyol (b) is in a range of from 85 to 105%.

3. The composition of claim 1, wherein the degrading-agent (B) comprises the maleic anhydride.

4. The composition of claim 1, wherein the degrading-agent (B) consists of the hexahydrophthalic anhydride and/or the maleic anhydride.

5. The composition of claim 1, wherein the degrading-agent (B) comprises the hexahydrophthalic anhydride.

6. The composition of claim 1, wherein the isocyanate component (a) comprises the toluene diisocyanate (TDI).

7. The composition of claim 1, wherein the isocyanate component (a) comprises the methylene-bis-(phenyl isocyanate) (MDI).

8. The composition of claim 1, wherein the degrading-agent (B) comprises the hexahydrophthalic anhydride (HHPA) and the maleic anhydride.

9. The composition of claim 1, wherein the chain extender (C) comprises the hydroquinone-bis-hydroxyethyl ether (HQEE).

10. The composition of claim 1, wherein the chain extender (C) comprises the 4,4'-methylenebis(o-chloroaniline) (MOCA).

11. The composition of claim 1, wherein the chain extender (C) comprises the dimethylthiotoluene diamine.

12. The composition of claim 1, wherein the chain extender (C) comprises the 1,4-butanediol.

13. A polyurethane composition formed from the polyurethane-forming composition of claim 1 by reacting
    (i) a modified prepolymer formed of a mixture of the prepolymer (A) and the degrading-agent (B),
    (ii) the chain extender (C), and
    optionally (iii) the additive (D).

14. The polyurethane composition of claim 13, wherein the polyol (b) and the isocyanate (a) have an NCO:OH ratio in the range of from 2:1 to 20:1.

15. An article, comprising:
    the polyurethane composition of claim 13.

16. The article of claim 15, which is a pumpable tool comprising a plug, a direct connect plug, a bridge plug, a wiper plug, a frac plug, a component of a frac plug, a drill in sand control beaded screen plug, an inflow control device plug, a polymeric plug, a disappearing wiper plug, a cementing plug, a ball, a diverter ball, a shifting and setting ball, a swabbing element protector, a buoyant recorder, a pumpable collet, a float shoe, or a dart.

17. The article of claim 15, which is a tool that inhibits flow comprising a seal, a high pressure beaded frac screen plug, a screen basepipe plug, a coating for a balls and a seat, a compression packing element, an expandable packing element, an O-ring, an attached seal, a bullet seal, a sub-surface safety valve seal, a sub-surface safety valve flapper seal, a dynamic seal, a V-ring, a backup ring, a drill bit seal, a liner port plug, an atmospheric disc, an atmospheric chamber disc, a debris barrier, a drill in stim liner plug, an inflow control device plug, a flapper, a seat, a ball seat, a direct connect disk, a drill-in linear disk, a gas lift valve plug, a fluid loss control flapper, an electric submersible pump seal, a shear out plug, a flapper valve, a gaslift valve, or a sleeve.

\* \* \* \* \*